(12) United States Patent
Satoh et al.

(10) Patent No.: US 7,086,164 B2
(45) Date of Patent: Aug. 8, 2006

(54) METHOD AND DEVICE FOR MEASURING DIRECTIONAL, AND COMPUTER PROGRAM

(75) Inventors: Masahiro Satoh, Iruma (JP); Kazuhiko Terashima, Tokyo (JP); Junji Satoh, Kawagoe (JP)

(73) Assignee: Citizen Watch Co., Ltd., Tokyo (JP)

(*) Notice: Subject to any disclaimer, the term of this patent is extended or adjusted under 35 U.S.C. 154(b) by 0 days.

(21) Appl. No.: 10/792,218

(22) Filed: Mar. 4, 2004

(65) Prior Publication Data

US 2004/0172838 A1 Sep. 9, 2004

(30) Foreign Application Priority Data

Mar. 5, 2003 (JP) .............................. 2003-058068
Feb. 17, 2004 (JP) .............................. 2004-040501

(51) Int. Cl.
*G01C 19/36* (2006.01)
(52) U.S. Cl. .................. 33/316; 33/356; 33/1 E
(58) Field of Classification Search .................. 33/316, 33/1 E, 318, 319, 355 R, 356
See application file for complete search history.

(56) References Cited

U.S. PATENT DOCUMENTS

| | | | | |
|---|---|---|---|---|
| 4,686,772 A | * | 8/1987 | Sobel | 33/333 |
| 5,525,901 A | * | 6/1996 | Clymer et al. | 342/207.21 |
| 5,953,683 A | * | 9/1999 | Hansen et al. | 702/95 |
| 6,536,123 B1 | * | 3/2003 | Tamura | 33/356 |
| 6,539,639 B1 | * | 4/2003 | Smith | 33/356 |
| 6,543,146 B1 | * | 4/2003 | Smith et al. | 33/356 |
| 6,768,957 B1 | * | 7/2004 | Kato | 702/92 |
| 6,836,971 B1 | * | 1/2005 | Wan | 33/356 |

FOREIGN PATENT DOCUMENTS

| | | |
|---|---|---|
| JP | 3008813 B2 | 12/1999 |
| JP | 2002-196055 A | 7/2002 |

\* cited by examiner

*Primary Examiner*—Diego Gutierrez
*Assistant Examiner*—Amy R. Cohen
(74) *Attorney, Agent, or Firm*—Sughrue Mion, PLLC

(57) ABSTRACT

A method for measuring a directional of a body in a three-dimensional space defined by an X-axis (magnetic north), a Y-axis, and a Z-axis is proposed. A geomagnetic force along an x-axis, which is the direction towards which the body points and an x-axis tilt angle, which is an angle between the horizontal plane and the x-axis, are detected. The x-axis tilt angle is determined as a rotation angle, which an angle by which the x-axis needs to be rotated around the Y-axis so as to be in the XY-plane. An azimuth of the body is calculated from the geomagnetic force and the rotation angle.

22 Claims, 11 Drawing Sheets

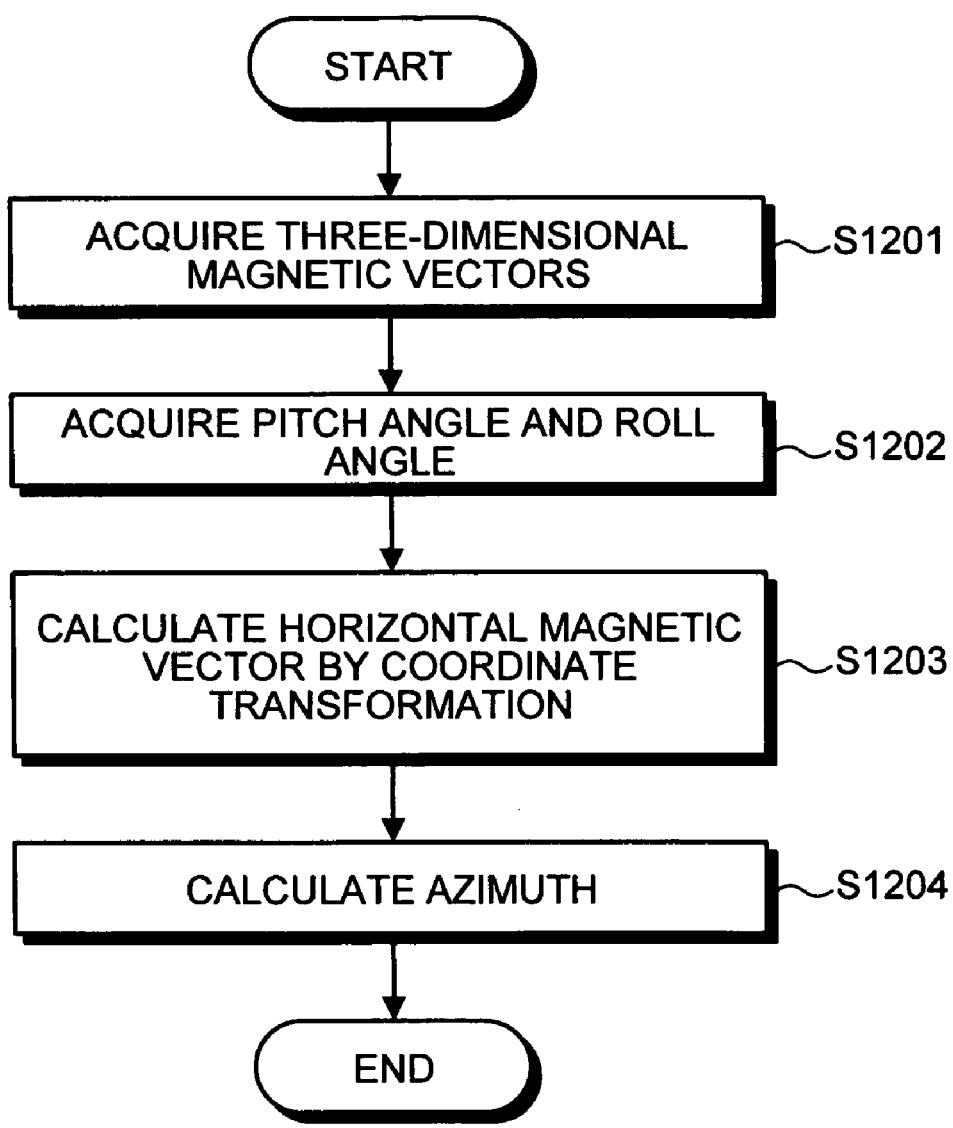

METHOD AND DEVICE FOR MEASURING DIRECTIONAL, AND COMPUTER PROGRAM

BACKGROUND OF THE INVENTION

1) Field of the Invention

The present invention relates to a technology for measuring a directional (i.e., direction and position) of an object in a three-dimensional space.

2) Description of the Related Art

The directional measuring devices, also called the electronic compasses, detect geomagnetic forces in each of a plurality of directions using a magnetic sensor corresponding to each direction and calculate a direction to be observed, i.e., a directional of an observation axis from the result of detection. Such directional measuring devices are used in cell phones, portable information terminals such as personal digital assistants (PDAs), wrist watches, car navigation systems such as vehicle compasses, attitude detectors for airplanes, directional measuring devices for visually impaired persons, and even game machines.

Particularly, position information service for the portable information terminals has been started recently. In the position information service, a present position of a portable information terminal is displayed on a screen of the portable information terminal along with a map of a surrounding area so that the user of the portable information terminal can locate his/her present position. By thus combining the directional measuring device with the portable information terminal on which the position information service can be enjoyed, it becomes possible for a user to recognize to which direction he/she is facing or to which direction he/she is going. The information providing service that employs the position information service and the directional measuring device is expected to create a lot of new business opportunities in various industrial fields in near future, and the other hand, the users are privileged by getting useful information. However, the spreading of the information providing service requires the precision of the directional measuring device to be increased from what it is at present.

The directional measuring devices have a drawback that an azimuth cannot be precisely measured if the directional measuring devices are in tilted posture. The users of the directional measuring devices may use them or hold them in various ways, and it is quite possible that a user holds his/her directional measuring device in such a manner that a magnetic sensor in the directional measuring device is in a tilted posture. If the magnetic sensor is in a tilted posture, although the observation axes indicate the identical azimuth, an output of the magnetic sensor changes according to an amount of the tilt, and therefore, an error may occur in calculation of the azimuths.

For example, if a biaxial magnetic sensor, which corresponds to an x-axis and a y-axis orthogonal to the x-axis, is rotated around a vertical axis so that the x-axis and the y-axis tilt by a certain tilt angle with respect to the x-y plane, the output of the biaxial magnetic sensor cannot be expressed by simple sine waveform and cosine waveform but can only be expressed with complex waveforms depending on factors such as a dip of the tilt angle. Consequently, an azimuth θ (obtained with θ=arctan (y/x)) calculated from the output of the biaxial magnetic sensor is erroneous.

Japanese Patent Application Laid Open No. 2002-196055 (see page 5, equation 2) discloses an omnidirectional magnetic sensor capable of automatically correcting a tilt and precisely calculating the direction. FIG. 12 is a flowchart of a process procedure disclosed in the above-mentioned literature. As shown in this flowchart, three magnetic vectors corresponding to three dimensions (hereinafter, "three-dimensional magnetic vectors") are acquired from the output of the magnetic sensor (step S1201). A pitch angle and a roll angle of the body of the magnetic sensor are acquired from the output of a tilt sensor (step S1202). Coordinate transformation is performed twice to the coordinates of the three-dimensional magnetic vectors using the pitch angle and the roll angle to calculate a magnetic vector of a horizontal magnetic field component (step S1203). An azimuth is calculated from the magnetic vector of the horizontal magnetic field component (step S1204).

More specifically, the omnidirectional magnetic sensor employs a method of rotating the geomagnetic vector to the horizontal magnetic field component using the rotational transformation. In the rotational transformation, a product of a rotation matrix used to rotate the body of the omnidirectional magnetic sensor around the X-axis and a rotation matrix used to rotate the body around the Y-axis in an absolute coordinate system is used. The absolute coordinate system includes the X-axis that points towards the magnetic north on a horizontal plane, the Y-axis that is orthogonal to the X-axis on the horizontal plane, and the Z-axis that is orthogonal to the horizontal plane. A observation coordinate system that includes an x-axis that is the direction towards which the body points, a y-axis that is orthogonal to the x-axis, and a z-axis that is orthogonal to the x-axis and the xy plane. The rotational transformation is performed with respect to the absolute coordinate system. In other words, the rotation matrix corresponding to the X-axis is used to rotate the y-axis in the horizontal plane, and the rotation matrix corresponding to the Y-axis is used to rotate the x-axis in the horizontal plane.

Japanese Patent No. 3008813 (see page 10, FIG. 5) discloses a directional measuring device that calculates a true direction by correcting a declination of a magnetic direction. Generally, there is a slight difference between the true north, which is the north on the map, and the magnetic north, which is the direction towards which the needle of a magnetic compass points. Because of the geographical location of Japan, in Japan, the needle of the magnetic compass always points a little westward with respect to the true north. The directional measuring device disclosed employs a method to correct the magnetic direction based on the difference between the direction towards which the needle of the magnetic compass points and the true north.

In the conventional technology, however, when the body is in tilted posture, the azimuth of the body can not be obtained precisely, and, the ambiguity in the calculation of the azimuth increases as the tilt becomes larger. Such problem arises because of the fact that, when there is a tilt, the rotational transformation of the x-axis and the y-axis does not yield proper results. In other words, when there is a tilt, the reverse rotation of the x-axis and the y-axis around the X-axis by the roll angle and the reverse rotation of the x-axis and the y-axis around the Y-axis by the pitch angle do not yield proper result. The reason is that the tilt angles (pitch angle and roll angle), which are angles between the x-axis or the y-axis and the horizontal plane, cannot be used for the rotational transformation as they are.

When the y-axis is reversely rotated the roll angle around the X-axis to make it horizontal, the y-axis is shifted to the horizontal plane, but the x-axis is also shifted following the shift of the y-axis. Consequently, the tilt angle between the x-axis and the horizontal plane does not match the pitch angle, that is, a deviation occurs. Therefore, even if the x-axis is reversely rotated the pitch angle around the Y-axis, the x-axis cannot be shifted to the horizontal plane. The y-axis having already shifted to the horizontal plane also shifts from the horizontal plane through the rotation around the X-axis to cause the y-axis to deviate from the horizontal plane. Thus, in the conventional technology, the geomagnetic vectors are not returned to the horizontal plane depending on the tilt angles, resulting in erroneous calculation of the azimuth including the error accordingly.

On the other hand, it is possible to calculate an azimuth by rotating the tilt angle around the x-axis, the y-axis, and the z-axis forming the observation coordinate system. However, the x-axis, y-axis, and z-axis are difficult to be calculated because the factors involved in the rotational transformation become complex, and the azimuth is difficult to be calculated.

SUMMARY OF THE INVENTION

It is an object of the present invention to solve at least the problems in the conventional technology.

A directional measuring device according to an aspect of the present invention measures a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis. The directional measuring device includes an x-axis geomagnetic force detector that detects a geomagnetic force along the x-axis; an x-axis tilt angle detector that detects an x-axis tilt angle that is an angle between the horizontal plane and the x-axis; a determining unit that determines the x-axis tilt angle as a rotation angle that is an angle by which the x-axis needs to be rotated around the Y-axis so as to be in the horizontal plane; and an azimuth calculator that calculates an azimuth of the body based on the geomagnetic force and the rotation angle.

A directional measuring device according to another aspect of the present invention measures a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis. The directional measuring device includes a y-axis geomagnetic force detector that detects a geomagnetic force along a y-axis that is orthogonal to the x-axis; a z-axis geomagnetic force detector that detects a geomagnetic force along a z-axis that is orthogonal to both the x-axis and the y-axis; an x-axis tilt angle detector that detects an x-axis tilt angle that is an angle between the horizontal plane and the x-axis; a y-axis tilt angle detector that detects a y-axis tilt angle that is angle between the horizontal plane and the y-axis; a rotation angle calculator that calculates a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis; and an azimuth calculator that calculates an azimuth of the body based on the geomagnetic forces detected by both the y-axis geomagnetic force detector and the z-axis geomagnetic force detector and the rotation angle.

A directional measuring device according to still another aspect of the present invention measures a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis. The directional measuring device includes a first-axis geomagnetic force detector that detects a geomagnetic force along a first axis from among the x-axis, a y-axis that is orthogonal to the x-axis, and a z-axis that is orthogonal to both the x-axis and the y-axis; a second-axis geomagnetic force detector that detects a geomagnetic force along a second axis other than the first axis from among the x-axis, the y-axis, and the z-axis; a total geomagnetic force input unit that receives a total geomagnetic force at a present position of the body, wherein the total geomagnetic force is a vector addition of geomagnetic forces along the X-axis, the Y-axis, and the Z-axis; a geomagnetic force calculator that calculates a geomagnetic force along an axis other than the first axis and the second axis, from among the x-axis, the y-axis, and the z-axis based on the total geomagnetic force and the geomagnetic forces along both the first axis and the second axis; an x-axis tilt angle detector that detects an x-axis tilt angle that is an angle between the horizontal plane and the x-axis; a determining unit that determines the x-axis tilt angle as a rotation angle that is an angle by which the x-axis needs to be rotated around the Y-axis so as to be in the horizontal plane; and an azimuth calculator that calculates an azimuth of the body based on the geomagnetic force along the x-axis and the rotation angle.

A directional measuring device according to still another aspect of the present invention measures a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis. The directional measuring device includes a first-axis geomagnetic force detector that detects a geomagnetic force along a first axis from among the x-axis, a y-axis that is orthogonal to the x-axis, and a z-axis that is orthogonal to both the x-axis and the y-axis; a second-axis geomagnetic force detector that detects a geomagnetic force along a second axis other than the first axis from among the x-axis, the y-axis, and the z-axis; a total geomagnetic force input unit that receives a total geomagnetic force at a present position of the body, wherein the total geomagnetic force is a vector addition of geomagnetic forces along the X-axis, the Y-axis, and the Z-axis; a geomagnetic force calculator that calculates a geomagnetic force along an axis other than the first axis and the second axis, from among the x-axis, the y-axis, and the z-axis based on the total geomagnetic force and the geomagnetic forces along both the first axis and the second axis; an x-axis tilt angle detector that detects an x-axis tilt angle that is an angle between the horizontal plane and the x-axis; a y-axis tilt angle detector that detects a y-axis tilt angle that is an angle between the horizontal plane and the y-axis; a rotation angle calculator that calculates a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis; and an azimuth calculator that calculates an azimuth of the body based on the geomagnetic forces along the y-axis and the z-axis and the rotation angle.

A directional measuring method according to still another aspect of the present invention is a method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis. The directional measuring method includes detecting a geomagnetic force along the x-axis; detecting an x-axis tilt angle that is an angle between the horizontal plane and the x-axis; determining the x-axis tilt angle as a rotation angle that is an angle by which the x-axis needs to be rotated around the Y-axis so as to be in the horizontal plane; and calculating an azimuth of the body based on the geomagnetic force and the rotation angle.

A directional measuring method according to still another aspect of the present invention is a method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis. The directional measuring method includes detecting a geomagnetic force along a y-axis that is orthogonal to the x-axis; detecting a geomagnetic force along a z-axis that is orthogonal to both the x-axis and the y-axis; detecting an x-axis tilt angle that is an angle between the horizontal plane and the x-axis; detecting a y-axis tilt angle that is angle between the horizontal plane and the y-axis; calculating a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis; and calculating an azimuth of the body based on the geomagnetic forces detected along both the y-axis and the z-axis and the rotation angle.

A directional measuring method according to still another aspect of the present invention is a method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis. The directional measuring method includes detecting a geomagnetic force along a first axis from among the x-axis, a y-axis that is orthogonal to the x-axis, and a z-axis that is orthogonal to both the x-axis and the y-axis; detecting a geomagnetic force along a second axis other than the first axis from among the x-axis, the y-axis, and the z-axis; receiving a total geomagnetic force at a present position of the body, wherein the total geomagnetic force is a vector addition of geomagnetic forces along the X-axis, the Y-axis, and the Z-axis; calculating a geomagnetic force along an axis other than the first axis and the second axis, from among the x-axis, the y-axis, and the z-axis based on the total geomagnetic force and the geomagnetic forces along both the first axis and the second axis; detecting an x-axis tilt angle that is an angle between the horizontal plane and the x-axis; determining the x-axis tilt angle as a rotation angle that is an angle by which the x-axis needs to be rotated around the Y-axis so as to be in the horizontal plane; and calculating an azimuth of the body based on the geomagnetic force along the x-axis and the rotation angle.

A directional measuring method according to still another aspect of the present invention is a method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis. The directional measuring method includes detecting a geomagnetic force along a first axis from among the x-axis, a y-axis that is orthogonal to the x-axis, and a z-axis that is orthogonal to both the x-axis and the y-axis; detecting a geomagnetic force along a second axis other than the first axis from among the x-axis, the y-axis, and the z-axis; receiving a total geomagnetic force at a present position of the body, wherein the total geomagnetic force is a vector addition of geomagnetic forces along the X-axis, the Y-axis, and the Z-axis; calculating a geomagnetic force along an axis other than the first axis and the second axis, from among the x-axis, the y-axis, and the z-axis based on the total geomagnetic force and the geomagnetic forces along both the first axis and the second axis; detecting an x-axis tilt angle that is an angle between the horizontal plane and the x-axis; detecting a y-axis tilt angle that is an angle between the horizontal plane and the y-axis; calculating a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis; and calculating an azimuth of the body based on the geomagnetic forces along the y-axis and the z-axis and the rotation angle.

The computer program according to still other aspect of the present invention realizes the methods according to the present invention on a computer.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 12 is a flowchart of a process procedure of the conventional technology.

DETAILED DESCRIPTION

Exemplary embodiments of a method and a device for measuring a directional and a computer program according to the present invention are explained in detail below with reference to the accompanying drawings. In the embodiments, a coordinate system formed with an X (alphabetic capital letter) axis that points towards the magnetic north on a horizontal plane, a Y (alphabetic capital letter) axis that is orthogonal to the X-axis and is in the horizontal plane, and a Z (alphabetic capital letter) axis that is orthogonal to the horizontal plane, is referred to as an absolute coordinate system. Further, a direction towards which the body of the directional measuring device points is referred to as an x (alphabetic small letter) axis, an axis that is orthogonal to the x-axis is referred to as a y (alphabetic small letter) axis, and an axis that is orthogonal to both the x-axis and the y-axis is referred to as a z (alphabetic small letter) axis. The x-axis corresponds to the X-axis, the y-axis to the Y-axis, and the z-axis to the Z-axis.

Figure 1:
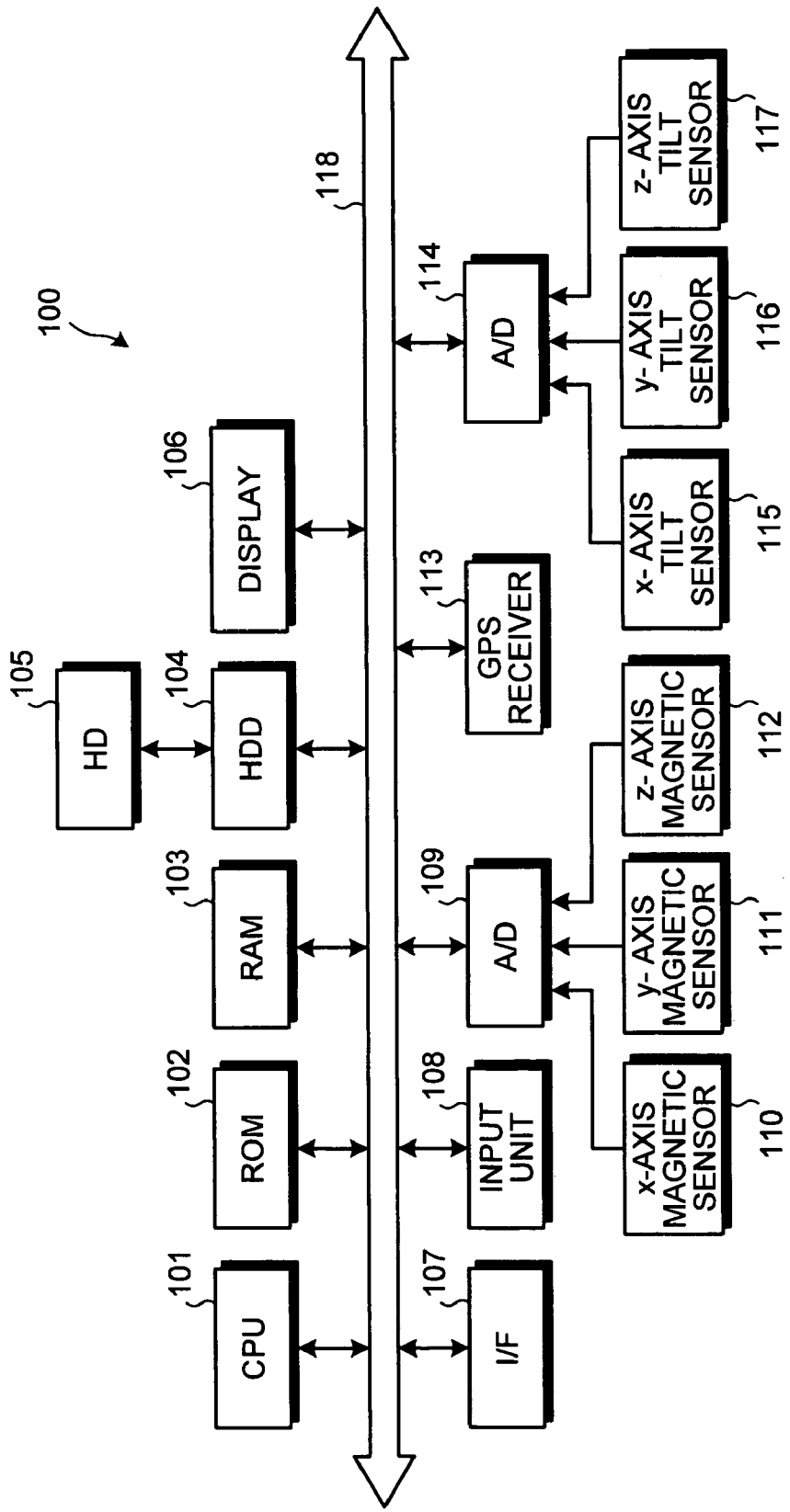
FIG. 1 is a block diagram of a hardware configuration of a directional measuring device according to an embodiment of the present invention.

FIG. 1 is a block diagram of a hardware configuration of a directional measuring device according to an embodiment of the present invention. A directional measuring device 100 includes a central processing unit (CPU) 101, a read only memory (ROM) 102, a random access memory (RAM) 103, a hard disk drive (HDD) 104, a hard disk (HD) 105, a display 106, an interface (I/F) 107, an input key 108, and an analog-to-digital (A/D) converter 109. The directional measuring device 100 also includes an x-axis magnetic sensor 110, a y-axis magnetic sensor 111, a z-axis magnetic sensor 112, a global positioning system (GPS) receiver 113, an analog-to-digital (A/D) converter 114, an x-axis tilt sensor 115, a y-axis tilt sensor 116, and a z-axis tilt sensor 117. The components communicate with one another through a bus 118.

The CPU 101 controls the whole of the directional measuring device 100. The ROM 102 stores programs such as a boot program. The RAM 103 is used as a work area of the CPU 101. The HDD 104 controls read/write of data from/to the HD 105 under the control of the CPU 101. The HD 105 stores data.

The display 106 displays a cursor, icons, or tool boxes, and data such as documents, images, and functional information. The display 106 may be a cathode ray tube (CRT), a thin film transistor (TFT) liquid crystal display, or a plasma display.

The I/F 107 is connected to a network such as the Internet through a communication line. The directional measuring device 100 is connected, via the I/F 107, to another devices that are connected to the network. The I/F 107 interfaces between the network and the components, and controls input/output of data from/to an external device. The I/F 107 may be a modem or a local area network (LAN) adaptor. The input unit 108 includes keys for inputting characters, numbers, and instructions, and data entry is executed through the input unit 108. The input unit 108 may be a touch-panel type input pad or a ten-digit keypad.

The A/D converter 109 converts outputs of the x-axis magnetic sensor 110, the y-axis magnetic sensor 111, and the z-axis magnetic sensor 112 to digital signals. The x-axis magnetic sensor 110 is disposed on the x-axis and detects magnetism of the Earth in the x-axis direction. The magnetism here means the magnetic flux, the flux density, or the magnetic field. Likewise, the y-axis magnetic sensor 111 is disposed on the y-axis and detects magnetism in the y-axis direction and the z-axis magnetic sensor 112 is disposed on the z-axis and detects magnetism in the z-axis direction. The x-axis magnetic sensor 110, the y-axis magnetic sensor 111, and the z-axis magnetic sensor 112 output the detected results in the form of electrical signals to the A/D converter 109.

The GPS receiver 113 receives radio waves from GPS satellites. The geographical position of the GPS receiver 113 with respect to each GPS satellite is calculated from the data in the radio waves received from a corresponding one of the GPS satellites. This determination is possible in any locations on Earth. The determination is performed using Link 1 (L1) radio waves with a carrier wave of 1575.42 megahertz (MHz) and including a course acquisition (C/A) code and a navigation message. The C/A code has a bit rate of 1.023 mega-bits-per-second (Mbps) and a code length of 1023 bits=1 milliseconds (ms). The navigation message has a bit rate of 50 bits-per-second (bps), sub-frames of a code length 300 bits=6 seconds (s), and main frames of code length 1500 bits=30 s. Five sub-frames form one main frame and 25 main frames form one master frame. In other words, the GPS receiver 113 receives radio waves from the GPS satellites to output GPS positioning data.

The A/D converter 114 converts outputs of the x-axis tilt sensor 115, the y-axis tilt sensor 116, and the z-axis tilt sensor 117 to digital signals. Each of the x-axis tilt sensor 115, the y-axis tilt sensor 116, and the z-axis tilt sensor 117 detects a tilt amount of each axis, and includes an acceleration sensor. Output of biaxial and triaxial acceleration sensor has low sensitivity to another axis, and therefore, it is possible to obtain an angle between the horizontal plane and each axis. The x-axis tilt sensor 115 is disposed on the x-axis and outputs an amount of tilt of the x-axis direction with respect to the horizontal plane. The y-axis tilt sensor 116 is disposed on the y-axis and outputs an amount of tilt of the y-axis direction with respect to the horizontal plane. The z-axis tilt sensor 117 is disposed on the z-axis and outputs an amount of tilt of the z-axis direction with respect to the horizontal plane.

Figure 2:
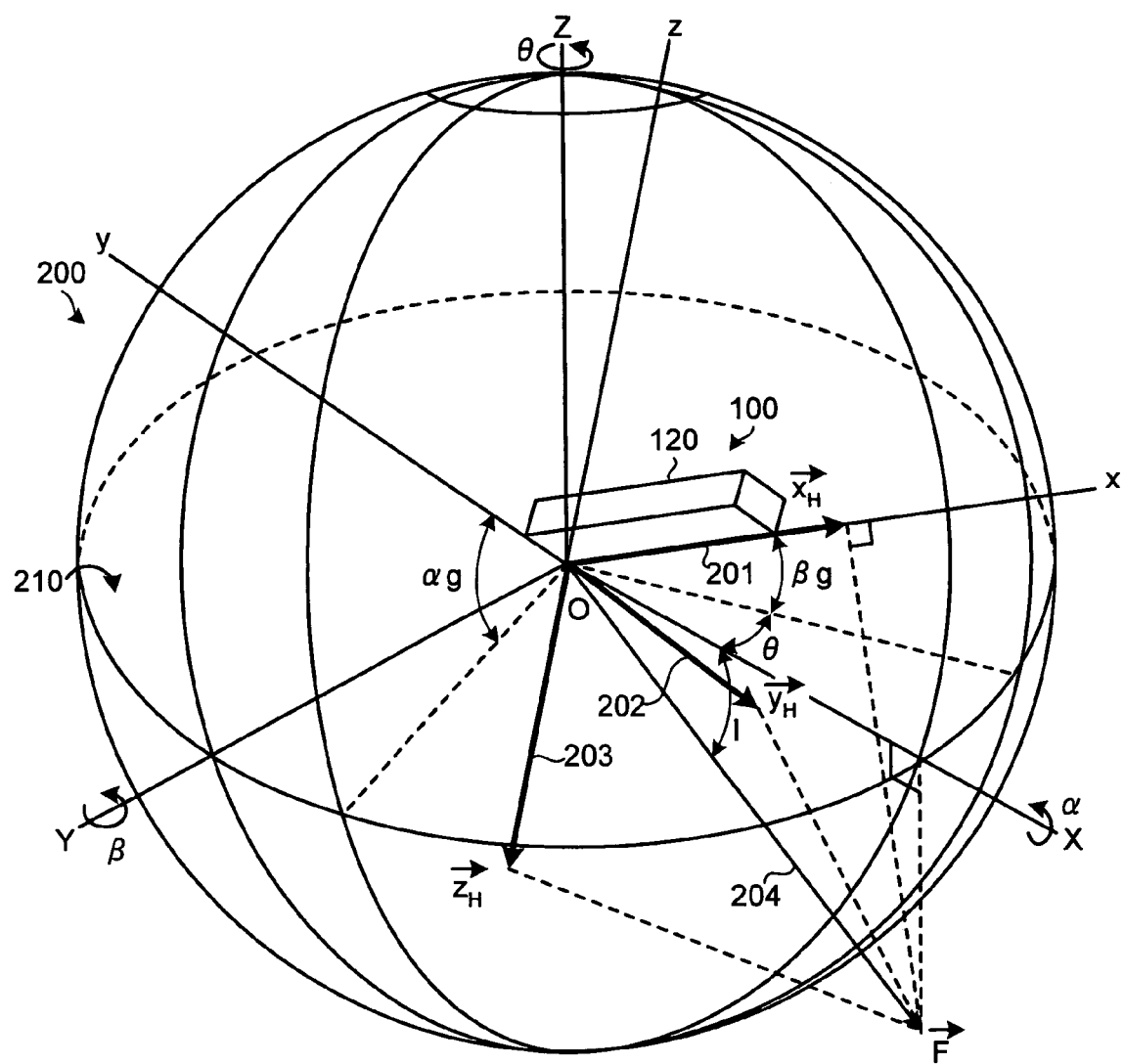
FIG. 2 is a diagram of an absolute coordinate system in which the directional measuring device is disposed.

FIG. 2 is a diagram of an absolute coordinate system in which the directional measuring device 100 is disposed. A three-dimensional space (sphere) 200 formed with the X-axis, the Y-axis, and the Z-axis constitutes the absolute coordinate system. The body 120 of the directional measuring device 100 is positioned at the origin 0. A direction that is parallel to the long side of the body 120 corresponds to the x-axis. An angle between the x-axis, when it is projected on a horizontal plane 210, and the X-axis is an azimuth $\theta$. Further, an angle (x-axis tilt angle) between the horizontal plane 210 and the x-axis is referred to as pitch angle $\beta g$, and is an angle when the body 120 is rotated around the Y-axis to be shifted to the horizontal plane 210. Furthermore, an angle (y-axis tilt angle) between the horizontal plane 210 and the y-axis is referred to as roll angle $\alpha g$, and is an angle when the body 120 is rotated around the X-axis to be shifted to the horizontal plane 210.

A vector 201 represents a geomagnetic vector in the x-axis direction detected by the x-axis magnetic sensor 110, a vector 202 represents a geomagnetic vector in the y-axis direction detected by the y-axis magnetic sensor 111, and a vector 203 represents a geomagnetic vector in the z-axis direction detected by the z-axis magnetic sensor 112. The length of the vectors 201 to 203 represents a geomagnetic force in the respective directions.

A vector 204 is obtained by vector addition of the vectors 201 to 203. An angle between the vector 204 and the horizontal plane 210 is a dip I at the present position of the body 120. Therefore, coordinates of the vector 204 in the absolute coordinate system can be obtained from:

$$(X, Y, Z) = (Sh \cdot \cos I, 0, Sh \cdot \sin I),$$

where Sh is an output value indicating the magnitude of the geomagnetic vector (total geomagnetic force F). A relation between each of the vectors 201 to 204 and each of the relative geomagnetic forces is described below:

$$|S_h| = \sqrt{\vec{x}_H^2 + \vec{y}_H^2 + \vec{z}_H^2} \qquad (1)$$

$$\vec{x}'_H = \frac{\vec{x}_H}{|S_h|} \qquad (2)$$

$$\vec{y}'_H = \frac{\vec{y}_H}{|S_h|} \qquad (3)$$

$$\vec{z}'_H = \frac{\vec{z}_H}{|S_h|} \qquad (4)$$

where $|S_h|$: OUTPUT VALUE OF MAGNETIC SENSOR CORRESPONDING TO TOTAL GEOMAGNETIC FORCE F $\vec{x}'_H$: VALUE OBTAINED BY NORMALIZING OUTPUT VALUE OF x-AXIS MAGNETIC SENSOR BY WHOLE OUTPUT VALUES $\vec{x}_H$: OUTPUT VALUE OF x-AXIS MAGNETIC SENSOR $\vec{y}'_H$: VALUE OBTAINED BY NORMALIZING OUTPUT VALUE OF y-AXIS MAGNETIC SENSOR BY WHOLE OUTPUT VALUES $\vec{y}_H$: OUTPUT VALUE OF y-AXIS MAGNETIC SENSOR $\vec{z}'_H$: VALUE OBTAINED BY NORMALIZING OUTPUT VALUE OF z-AXIS MAGNETIC SENSOR BY WHOLE OUTPUT VALUES $\vec{z}_H$: OUTPUT VALUE OF z-AXIS MAGNETIC SENSOR.

The pitch angle $\beta g$ (x-axis tilt angle) and the roll angle $\alpha g$ (y-axis tilt angle) are detected by the x-axis tilt sensor 115 and the y-axis tilt sensor 116. A relation between the vectors detected by the x-axis tilt sensor 115, the y-axis tilt sensor 116, and the z-axis tilt sensor 117 and their relevant tilt amounts is described below:

$$\alpha_g = \sin^{-1} \frac{\vec{y}_g}{W_g} \qquad (5)$$

$$\beta_g = \sin^{-1} \frac{\vec{x}_g}{W_g} \qquad (6)$$

$$W_g = \sqrt{\vec{x}_g^2 + \vec{y}_g^2 + \vec{z}_g^2} \qquad (7)$$

where $\vec{x}_g$: OUTPUT VALUE OF x-AXIS ACCELERATION SENSOR $\vec{y}_g$: OUTPUT VALUE OF y-AXIS ACCELERATION SENSOR $\vec{z}_g$: OUTPUT VALUE OF z-AXIS ACCELERATION SENSOR $W_g$: TOTAL VALUE OF OUTPUTS OF ACCELERATION SENSORS CORRESPONDING TO GRAVITY ACCELERATION.

Figure 3:
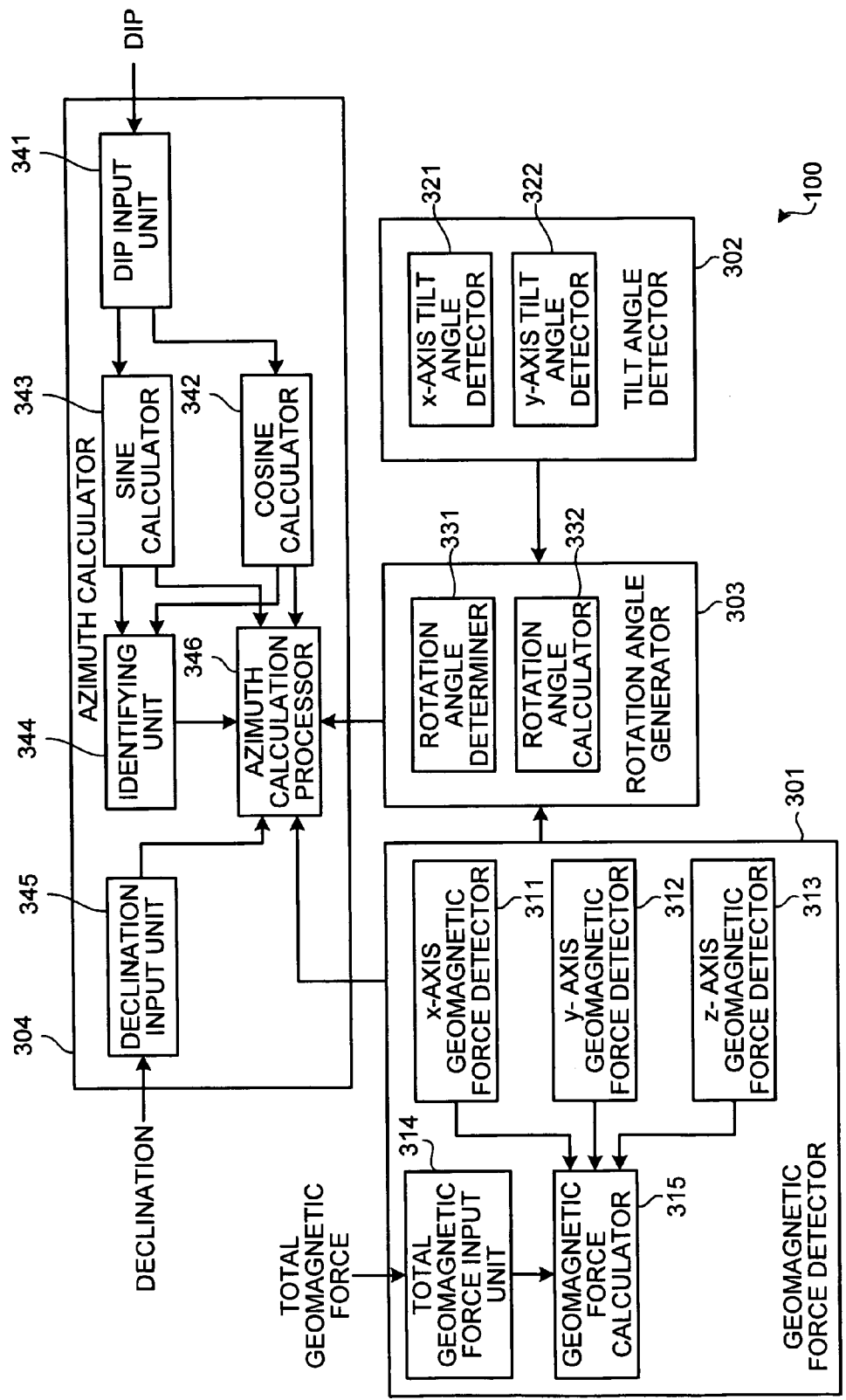
FIG. 3 is a block diagram of a functional configuration of the directional measuring device.

FIG. 3 is a block diagram of a functional configuration of the directional measuring device 100. The directional measuring device 100 includes a geomagnetic force detector 301, a tilt angle detector 302, a rotation angle generator 303, and an azimuth calculator 304.

The geomagnetic force detector 301 includes an x-axis direction geomagnetic force detector 311 (hereinafter, "x-axis geomagnetic force detector 311"), a y-axis direction geomagnetic force detector 312 (hereinafter, "y-axis geomagnetic force detector 312"), a z-axis direction geomagnetic force detector 313 (hereinafter, "z-axis geomagnetic force detector 313"), a total geomagnetic force input unit 314, and a geomagnetic force calculator 315.

The x-axis geomagnetic force detector 311 detects a geomagnetic force in the x-axis direction. More specifically, the x-axis geomagnetic force detector 311 detects the geomagnetic force in the x-axis direction from the output of the x-axis magnetic sensor 110, and normalizes the geomagnetic force detected by an output value Sh of the total geomagnetic force F.

The y-axis geomagnetic force detector 312 detects a geomagnetic force in the y-axis direction. More specifically, the y-axis geomagnetic force detector 312 detects the geomagnetic force in the y-axis direction from the output of the y-axis magnetic sensor 111, and normalizes the geomagnetic force detected by an output value Sh of the total geomagnetic force F.

The z-axis geomagnetic force detector 313 detects a geomagnetic force in the z-axis direction. More specifically, the z-axis geomagnetic force detector 313 detects the geomagnetic force in the z-axis direction from the output of the z-axis magnetic sensor 112, and normalizes the geomagnetic force detected by an output value Sh of the total geomagnetic force F.

The total geomagnetic force input unit 314 inputs a total geomagnetic force at a present position of the body 120. More specifically, the information for the present position of the body 120 obtained from the GPS receiver 113 is transmitted to a server (not shown). The server identifies a latitude and a longitude of the present position of the body 120 from the received present position information and transmits the value Sh of the total geomagnetic force F corresponding to the latitude and the longitude to the directional measuring device 100. The directional measuring device 100 receives the value Sh of the total geomagnetic force F.

The geomagnetic force calculator 315 calculates a geomagnetic force in a direction of an axis (third axis) other than a first axis and a second axis based on the total geomagnetic force at the present position input by the total geomagnetic force input unit 314 and geomagnetic force detectors in two axes (the first axis and the second axis) of the geomagnetic force detector 301. The geomagnetic force detectors in two axes are selected from the x-axis geomagnetic force detector 311, the y-axis geomagnetic force detector 312, and the z-axis geomagnetic force detector 313.

More specifically, if the directional measuring device 100 includes only the x-axis magnetic sensor 110 and the y-axis magnetic sensor 111, a geomagnetic force in the z-axis direction can be calculated using the equation (1).

The tilt angle detector 302 includes an x-axis tilt angle detector 321 and a y-axis tilt angle detector 322. The x-axis tilt angle detector 321 detects the x-axis tilt angle, which is the pitch angle $\beta g$, between the horizontal plane 210 and the x-axis from the output of the x-axis tilt sensor 115. The y-axis tilt angle detector 322 detects the y-axis tilt angle, which is the roll angle $\alpha g$, between the horizontal plane 210 and the y-axis from the output of the y-axis tilt sensor 116.

The rotation angle generator 303 includes a rotation angle determiner 331 and a rotation angle calculator 332. The rotation angle determiner 331 determines the pitch angle $\beta g$ detected by the x-axis tilt angle detector 321 as a rotation angle when the x-axis is rotated around the Y-axis to rotationally shift to the horizontal plane 210 (hereinafter, "Y-axis rotation angle $\beta$"). In other words, in the calculation principle of an X-axis rotation angle $\alpha$ explained later, rotational shifting is started from the x-axis as the observation axis, and therefore, an error due to rotational shifting of another axis is not included. Accordingly, the x-axis tilt angle becomes an identical angle to the Y-axis rotation angle $\beta$. (See equation (13), explained later)

If the x-axis is rotated by the x-axis tilt angle (pitch angle $\beta g$) around the Y-axis to be shifted to the horizontal plane 210 and the y-axis is rotationally shifted following the rotational shifting of the x-axis, the rotation angle calculator 332 calculates a rotation angle which the y-axis is rotated around the X-axis to be shifted to the horizontal plane 210 (hereinafter, "X-axis rotation angle $\alpha$"). This calculation is performed based on the x-axis tilt angle detected by the x-axis tilt angle detector 321 and the y-axis tilt angle detected by the y-axis tilt angle detector 322. The calculation principle of the X-axis rotation angle is explained later.

The azimuth calculator 304 includes a dip input unit 341, a cosine calculator 342, a sine calculator 343, an identifying unit 344, a declination input unit 345, and an azimuth calculation processor 346. The dip input unit 341 inputs a dip between the geomagnetic vector at the present position of the body 120 and the horizontal plane 210. More specifically, the information for the present position of the body 120 obtained from the GPS receiver 113 is transmitted to the server (not shown). The server identifies a latitude and a longitude indicating the present position of the body 120 from the received present position information and transmits dip data corresponding to the latitude and the longitude to the directional measuring device 100. The directional measuring device 100 receives the dip data.

The cosine calculator 342 calculates a cosine value of an azimuth of the body 120 based on the geomagnetic force detected by the x-axis geomagnetic force detector 311 and the Y-axis rotation angle $\beta$ determined by the rotation angle determiner 331. The sine calculator 343 calculates a sine value $\sin\theta$ of the azimuth $\theta$ of the body 120 based on the respective geomagnetic forces detected by the y-axis geomagnetic force detector 312 and the z-axis geomagnetic force detector 313 and the X-axis rotation angle calculated by the rotation angle calculator 332. The cosine calculator 342 and the sine calculator 343 are explained in detail later.

The identifying unit 344 identifies an angular range of the azimuth based on the sine value and the cosine value. More specifically, if both the cosine value $\cos\theta$ and the sine value $\sin\theta$ are positive, the azimuth $\theta$ is identified as an angular range of $0° \leq \theta \leq 90°$. If the cosine value $\cos\theta$ is negative and the sine value $\sin\theta$ is positive, the azimuth $\theta$ is identified as an angular range of $90° \leq \theta \leq 180°$. Further, if both the cosine value $\cos\theta$ and the sine value $\sin\theta$ are negative, the azimuth $\theta$ is identified as an angular range of $180° \leq \theta \leq 270°$. Furthermore, if the cosine value $\cos\theta$ is positive and the sine value $\sin\theta$ is negative, the azimuth $\theta$ is identified as an angular range of $270° \leq \theta \leq 360°$.

The declination input unit 345 inputs a declination between magnetic north at the present position and true north. More specifically, the declination input unit 345 receives the information for the present position of the body 120 from the GPS receiver 113 and transmits it to the server (not shown). The server identifies latitude and longitude of the present position of the body 120 from the received present position information and transmits declination data corresponding to the latitude and the longitude to the directional measuring device 100. The directional measuring device 100 receives the declination data.

The azimuth calculation processor 346 calculates an azimuth of the body 120. More specifically, if the cosine calculator 342 calculates a cosine value $\cos\theta$ of the azimuth $\theta$, then the azimuth calculation processor 346 calculates the azimuth $\theta$ by the inverse function of the cosine value $\cos\theta$. If the sine calculator 343 calculates a sine value $\sin\theta$ of the azimuth $\theta$, then the azimuth calculation processor 346 calculates the azimuth $\theta$ by the inverse function of the sine value $\sin\theta$. The azimuth $\theta$ can also be calculated by the inverse function of a tangent $\tan\theta$ of the azimuth $\theta$.

Furthermore, when the identifying unit 344 has identified the angular range, the azimuth calculation processor 346 can also calculate the azimuth $\theta$ by the identified angular range and any of the inverse function of the sine value $\sin\theta$, the inverse function of the cosine value $\cos\theta$, and the inverse function of the tangent $\tan\theta$ of the azimuth $\theta$. Moreover, the calculated azimuth $\theta$ is corrected by using the declination D input by the declination input unit 345 to also calculate an azimuth $\theta'$ based on true north as a reference.

Note that the geomagnetic force detector 301, the tilt angle detector 302, the rotation angle generator 303, and the azimuth calculator 304 perform their functions when the CPU 101 executes programs stored in the ROM 102, RAM 103, and HD 105 as shown in FIG. 1.

Figure 4:
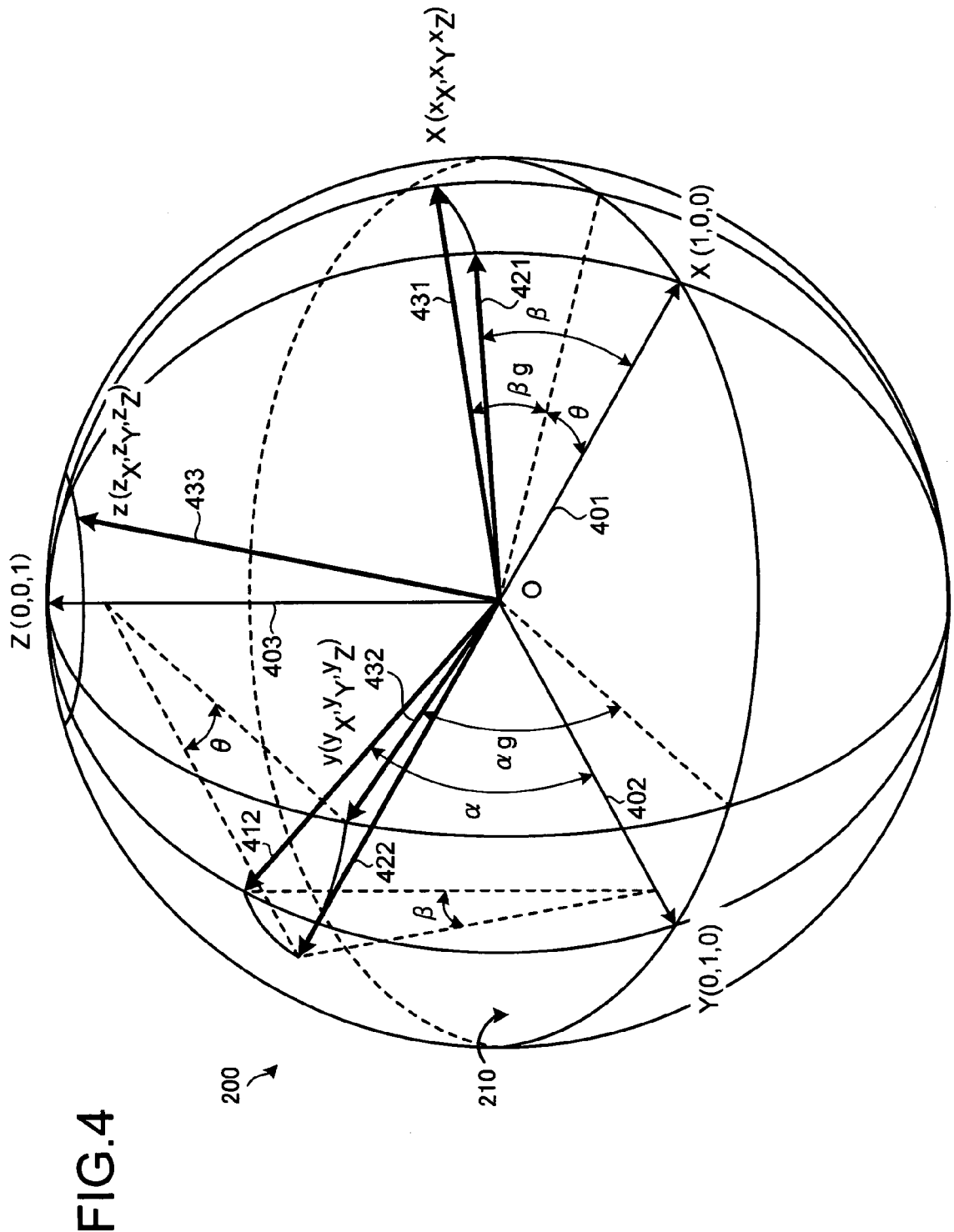
FIG. 4 is a diagram to explain a principle for calculation of an X-axis rotational angle a of the directional measuring device.

FIG. 4 is a diagram of a calculation principle of an X-axis rotational angle $\alpha$ of the directional measuring device 100 according to the embodiment of the present invention.

As shown in FIG. 4, unit direction vectors 401 to 403 are provided in the X-axis, Y-axis, and the Z-axis, respectively. The unit direction vectors 401 to 403 are rotationally shifted to the x-axis, y-axis, and the z-axis respectively using the coordinate expression for their rotations three times (three-rotation coordinate expression).

$$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix} \quad (8)$$

Where $\alpha$ is a rotation angle around the X-axis, $\beta$ is an x-axis tilt angle $\beta g$ as a rotation angle around the Y-axis, and $\theta$ is a rotation angle around the Z-axis as an azimuth of the body 120.

The three-rotation coordinate expression as shown in equation (8) is explained below. As one example, rotation of the X-axis, Y-axis, and Z-axis is counterclockwise in the equation (8). In the calculation principle of the X-axis rotation angle α, each direction vector of rotated axes (x-axis, y-axis, and z-axis of the observation coordinate system) is handled as a unit vector, and each component of the observation coordinate axes (x-axis, y-axis, and z-axis) is basically expressed by using the absolute coordinate system (X-axis, Y-axis, and Z-axis).

The important point of this expression is that the rotation angle around the Z-axis and the azimuth θ of the observation axis (x-axis) can be expressed as being identical to each other. Therefore, a point on a sphere of the absolute coordinate system as shown in FIG. 4 is expressed by a product of three determinants of rotation matrices as X-axis rotation α, Y-axis rotation β, and Z-axis rotation θ. Further, the observation axis (x-axis) corresponds to the X-axis to cause "θ" in the three-rotation coordinate expression in the equation (8) to correspond to the azimuth of the observation axis.

In other words, it is necessary to rotate an axis (x-axis) to be observed initially and rotate the axis around the vertical axis lastly. By using a point on spatial coordinates rotated in the order, the angle θ of the rotation angle and the azimuth of the observation axis can be identically expressed without depending on the X-axis rotation α and the Y-axis rotation β. As explained above, the three-rotation coordinate expression is a basic relational expression that is derived from the idea and used to derive an azimuth θ highly precisely. This expression is excellent in that the algorism is simple and the program is not complicated. The three-rotation coordinate expression is explained in detail below.

In the three-rotation coordinate expression, the unit direction vectors 401 to 403 are rotated three times. The unit direction vectors 401 to 403 are explained below. The unit direction vectors 401 to 403 are rotated an angle α around the X-axis (first rotation). The unit direction vector 401 is kept as it is even through the first rotation. The unit direction vector 402 becomes a unit direction vector 412 through the first rotation.

The unit direction vectors 401 and 412 after the first rotation are rotated an angle β around the Y-axis (second rotation). The unit direction vector 401 becomes a unit direction vector 421 through the second rotation, while the unit direction vector 412 becomes a unit direction vector 422 through the second rotation. Then, the unit direction vectors 421 and 422 after the second rotation are rotated an angle θ around the Z-axis (third rotation). The unit direction vector 421 becomes a unit direction vector 431 through the third rotation, while the unit direction vector 422 becomes a unit direction vector 432 through the third rotation. The unit direction vector 403 becomes a unit direction vector 433 through the first to third rotations. The unit direction vectors 431, 432, and 433 after the third rotation are respectively positioned on the x-axis, y-axis, and z-axis that form the observation coordinate system of the body 120.

The coordinates of the unit direction vectors 431 to 433 after the third rotation can be expressed respectively by the following equations (9) to (11) with the angular parameters α, β, and θ used for the three-rotation coordinate expression.

$$\vec{x} = \begin{bmatrix} x_X \\ x_Y \\ x_Z \end{bmatrix} = \begin{bmatrix} \cos\beta \times \cos\theta \\ -\cos\beta \times \sin\theta \\ \sin\beta \end{bmatrix} \quad (9)$$

$$\vec{y} = \begin{bmatrix} y_X \\ y_Y \\ y_Z \end{bmatrix} = \begin{bmatrix} \cos\alpha \times \sin\theta + \sin\alpha \times \sin\beta \times \cos\theta \\ \cos\alpha \times \cos\theta - \sin\alpha \times \sin\beta \times \sin\theta \\ -\sin\alpha \times \cos\beta \end{bmatrix} \quad (10)$$

-continued $$\vec{z} = \begin{bmatrix} z_X \\ z_Y \\ z_Z \end{bmatrix} = \begin{bmatrix} \sin\alpha \times \sin\theta - \cos\alpha \times \sin\beta \times \cos\theta \\ \sin\alpha \times \cos\theta + \cos\alpha \times \sin\beta \times \sin\theta \\ \cos\alpha \times \cos\beta \end{bmatrix} \quad (11)$$

Further, the pitch angle $\beta g$ can be expressed by the following equation (12).

$$\tan\beta_g = \frac{x_Z}{\sqrt{x_X^2 + x_Y^2}} \quad (12)$$

The relation of the following equation (13) is derived by substituting values of the equation (9) in the right side of the equation (12).

$$\beta g = \beta \quad (13)$$

Therefore, the pitch angle $\beta g$ and the rotation angle β around the Y-axis as shown in FIG. 4 are identical to each other.

On the other hand, the roll angle αg can be expressed by the following equation (14).

$$\tan\alpha_g = \frac{y_Z}{\sqrt{y_X^2 + y_Y^2}} \quad (14)$$

The relation of the following equation (15) is derived by substituting values of the equation (10) in the right side of the equation (14).

$$\alpha = -\sin^{-1}\frac{\tan\alpha_g}{\sqrt{\cos^2\beta_g \times (1 + \tan^2\alpha_g)}} \quad (15)$$

Based on the equation (13) and the equation (15), the Y-axis rotation angle β becomes equal to an angle calculated from the x-axis tilt sensor 115, i.e., the pitch angle βg between the x-axis and the horizontal plane 210. However, the X-axis rotation angle α does not become equal to the roll angle αg between the y-axis and the horizontal plane 210. (See FIG. 4) Further, a negative sign is provided on the right side of the equation (15) because the inequality depends on the relation between the roll angle αg and the X-axis rotation angle α. The signs of α and αg are reversely provided in this example, and therefore, the negative sign is provided. As explained above, the rotation angle calculator 332 of FIG. 3 can transform the X-axis rotation angle α and the Y-axis rotation angle β from the y-axis tilt angle αg and the x-axis tilt angle βg according to the equation (13) and the equation (15) to calculate them.

The calculation principle of an azimuth θ of the directional measuring device 100 according to the embodiment of the present invention is explained below with reference to FIG. 2 and FIG. 4. A relation between each geomagnetic vector obtained from the x-axis magnetic sensor 110, the y-axis magnetic sensor 111, and the z-axis magnetic sensor 112 and each direction of the geomagnetic vectors is viewed. It is assumed that the calculation does not undergo magnetic influence except for geomagnetism. As shown in FIG. 2, if the x-axis is on the XZ plane, an output of the x-axis magnetic sensor 110 becomes a maximum value Sh. Assume an output of the x-axis magnetic sensor 110 is xH and an angle between the geomagnetic vector and the x-axis is γx. The output xH can be expressed by the following equation (16) in which the output xH is proportional to a product of the output value Sh in the geomagnetic direction and a cosine cos γx of the angle γx. If γx ranges from −90° and 90°, the value of xH becomes positive, and if γx ranges from 90° and 270°, the value of xH becomes negative. In other words, γx has positive and negative polarities with respect to the direction of the geomagnetic vector.

$$\vec{x} \cdot \vec{S}_h = |\vec{x}| |\vec{S}_h| \times \cos \gamma_x = |\vec{x}| \times \vec{x}_H = \vec{x}_H \quad (16)$$

where $\vec{x}$ : UNIT DIRECTION VECTOR IN x-AXIS DIRECTION $\vec{x}_H$: OUTPUT VALUE OF x-AXIS MAGNETIC SENSOR.

It is understood that an inner product, between the unit direction vector 421 in the x-axis direction that is rotated by the three-rotation coordinate expression and the geomagnetic vector, is derived as shown in the equation (16), and that the inner product becomes equal to an output of the x-axis magnetic sensor 110. Further, it is understood that the y-axis and the z-axis have the similar relational equations (equation (17), equation (18)).

$$\vec{y} \cdot \vec{S}_h = \vec{y}_H \quad (17)$$

$$\vec{z} \cdot \vec{S}_h = \vec{z}_H \quad (18)$$

where $\vec{y}$ : UNIT DIRECTION VECTOR IN y-AXIS DIRECTION $\vec{z}$ : UNIT DIRECTION VECTOR IN z-AXIS DIRECTION $\vec{y}_H$: OUTPUT VALUE OF y-AXIS MAGNETIC SENSOR $\vec{z}_H$: OUTPUT VALUE OF z-AXIS MAGNETIC SENSOR.

Components of the geomagnetic vector 204 are expressed in the following equation (20).

$$\vec{S}_h = \begin{bmatrix} |S_h| \cdot \cos I \\ 0 \\ |S_h| \cdot \sin I \end{bmatrix} \quad (20)$$

Where I is a dip as a tilt between the geomagnetic vector 204 and the horizontal plane 210, and the upper side of the horizontal plane 210 is a positive angle. Therefore, in Japan, the dip faces downward from the horizontal plane 210, and accordingly, the dip indicates a negative angle.

The following equation (21) is obtained by substituting the equation (9) and the equation (20) in the left side of the equation (16).

$$\vec{x} \cdot \vec{S}_h = \begin{bmatrix} x_x \\ x_y \\ x_z \end{bmatrix} \cdot \begin{bmatrix} |S_h| \cdot \cos I \\ 0 \\ |S_h| \cdot \sin I \end{bmatrix} \quad (21)$$

$$= |S_h| \times (\cos I \times \cos\beta \times \cos\theta + \sin I \times \sin\beta) = \vec{x}_H$$

The following equation (22) is obtained by substituting the equation (10) and the equation (20) in the left side of the equation (17).

$$\vec{y} \cdot \vec{S}_h = \begin{bmatrix} y_x \\ y_y \\ y_z \end{bmatrix} \cdot \begin{bmatrix} |S_h| \cdot \cos I \\ 0 \\ |S_h| \cdot \sin I \end{bmatrix} \quad (22)$$

$$= |S_h| \times \begin{bmatrix} \cos I \times (\cos\alpha \times \sin\theta + \sin\alpha \times \sin\beta \times \cos\theta) \\ -\sin I \times \cos\beta \times \sin\alpha \end{bmatrix} = \vec{y}_H$$

The following equation (23) is obtained by substituting the equation (11) and the equation (20) in the left side of the equation (18).

$$\vec{z} \cdot \vec{S}_h = \begin{bmatrix} z_x \\ z_y \\ z_z \end{bmatrix} \cdot \begin{bmatrix} |S_h| \cdot \cos I \\ 0 \\ |S_h| \cdot \sin I \end{bmatrix} \quad (23)$$

$$= |S_h| \times \begin{bmatrix} \cos I \times (\sin\alpha \times \sin\theta + \cos\alpha \times \\ \sin\beta \times \cos\theta) + \sin I \times \cos\alpha \times \cos\beta \end{bmatrix} = \vec{z}_H$$

The equation (21) to equation (23) are combined into one equation and the output values of the x-axis magnetic sensor 110, y-axis magnetic sensor 111, and z-axis magnetic sensor 112 are normalized by the total geomagnetic force Sh. Therefore, by substituting the equation (2) to the equation (4) in the equation (21) to equation (23), respectively, a relational expression between the geomagnetism and the azimuth is obtained as shown in the following equation (24).

$$\begin{bmatrix} \vec{x}'_H \\ \vec{y}'_H \\ \vec{z}'_H \end{bmatrix} = \begin{bmatrix} \cos I \times \cos\beta \times \cos\theta + \sin I \times \sin\beta \\ \cos I \times \cos\alpha \times \sin\theta + \cos I \times \sin\alpha \times \sin\beta \times \\ \cos\theta - \sin I \times \cos\beta \times \sin\alpha \\ \cos I \times \sin\alpha \times \sin\theta - \cos I \times \cos\alpha \times \sin\beta \times \\ \cos\theta + \sin I \times \cos\alpha \times \cos\beta \end{bmatrix} \quad (24)$$

The simultaneous equation of the equation (24) is solved in order to obtain a cosine value cosθ of the azimuth θ and a sine value sinθ of the azimuth θ, and the following equation (25) and equation (26) are obtained.

$$\sin\theta = \frac{\vec{y}'_H \times \cos\alpha + \vec{z}'_H \times \sin\alpha}{\cos I} \quad (25)$$

$$\cos\theta = \frac{\vec{x}'_H - \sin I \times \sin\beta}{\cos I \times \cos\beta} \quad (26)$$

An actual azimuth θ is obtained by calculating the inverse function of the equation (25) or the equation (26). The dip I is kept as it is if the measured position remains as it is, and therefore, a value corresponding to the measured position may be input as an initial value.

Figure 5:
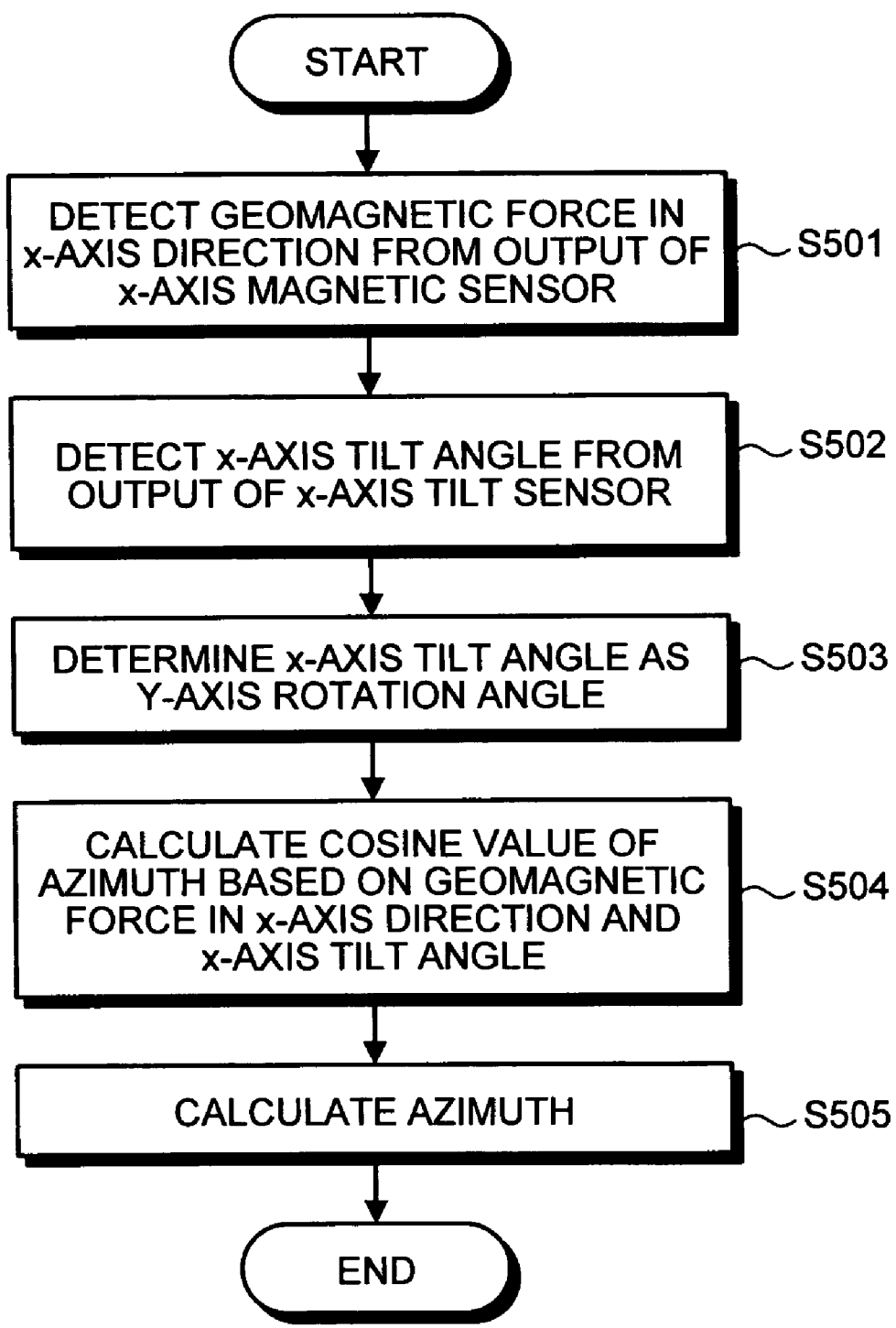
FIG. 5 is a flowchart of a process procedure for calculating a directional (hereinafter, "directional calculation procedure") (part 1)

FIG. 5 is a flowchart of a directional calculation procedure (part 1) according to the embodiment of the present invention. The dip I at the present position is assumed to be given by the following equation (27) to equation (29).

$$I_{2000.0} = 51°03'.804 + 73'.745\Delta\phi - 9'.472\Delta\lambda - 0'.771\Delta\phi^2 - 0'.459\Delta\phi\Delta\lambda + 0'.359\Delta\lambda^2 \quad (27)$$

$$\Delta\phi = (\text{LATITUDE } \phi \text{ AT MEASURED POSITION}) - 37 \quad (28)$$

$$\Delta\lambda = (\text{LONGITUDE } \lambda \text{ AT MEASURED POSITION}) - 138 \quad (29)$$

As shown in FIG. 5, a geomagnetic force in the x-axis direction is detected from the output of the x-axis magnetic sensor 110 (step S501). An x-axis tilt angle (pitch angle βg) is detected from the output of the x-axis tilt sensor 115 (step S502). The x-axis tilt angle (pitch angle βg) is determined, using the equation (13), as a Y-axis rotation angle β as a rotation angle when the x-axis is rotated around the Y-axis to be shifted to the horizontal plane 210 (step S503). A cosine value $\cos\theta$ of the azimuth $\theta$ is calculated, using the equation (26), based on the geomagnetic force in the x-axis direction and the determined Y-axis rotation angle $\beta$ (step S504). The azimuth $\theta$ is calculated from the inverse function of the cosine value $\cos\theta$ (step S505). According to the process procedure, only by detecting the geomagnetic force in the x-axis direction and the x-axis tilt angle $\beta g$, it is possible to calculate the azimuth $\theta$ of the body 120 using the simple computational equation.

Figure 6:
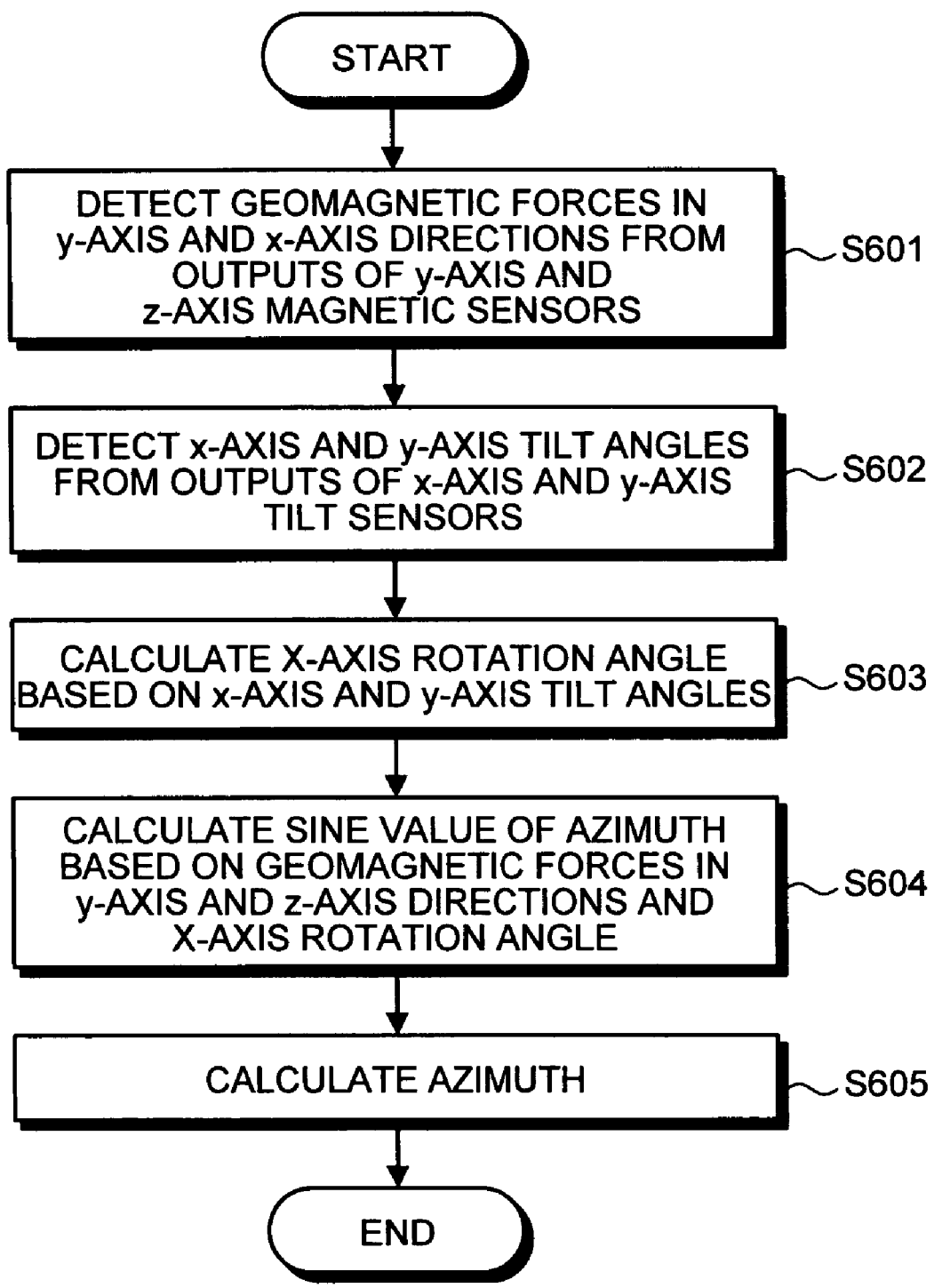
FIG. 6 is a flowchart of a process procedure for calculating a directional (hereinafter, "directional calculation procedure") (part 2)

FIG. 6 is a flowchart of a directional calculation procedure (part 2) according to the embodiment of the present invention. The dip I at the present position is assumed to be given by the equation (27) to the equation (29).

As shown in FIG. 6, geomagnetic forces in the y-axis direction and the z-axis direction are detected from the outputs of the y-axis magnetic sensor 111 and the z-axis magnetic sensor 112 (step S601). An x-axis tilt angle (pitch angle $\beta g$) and a y-axis tilt angle (roll angle $\alpha g$) are detected from the outputs of the x-axis tilt sensor 115 and the y-axis tilt sensor 116 (step S602). The X-axis rotation angle $\alpha$ is calculated, using the equation (25), based on the pitch angle $\beta g$ and the roll angle $\alpha g$ (step S603). A sine value $\sin\theta$ of an azimuth $\theta$ is calculated based on the geomagnetic forces in the y-axis direction and the z-axis direction and the X-axis rotation angle $\alpha$ (step S604). The azimuth $\theta$ is calculated from the inverse function of the sine value $\sin\theta$ (step S605). According to the process procedure, only by detecting the geomagnetic forces in the y-axis direction and the z-axis direction and the y-axis tilt angle (roll angle $\alpha g$), it is possible to calculate the azimuth $\theta$ of the body 120 using the simple computational equation.

Figure 7:
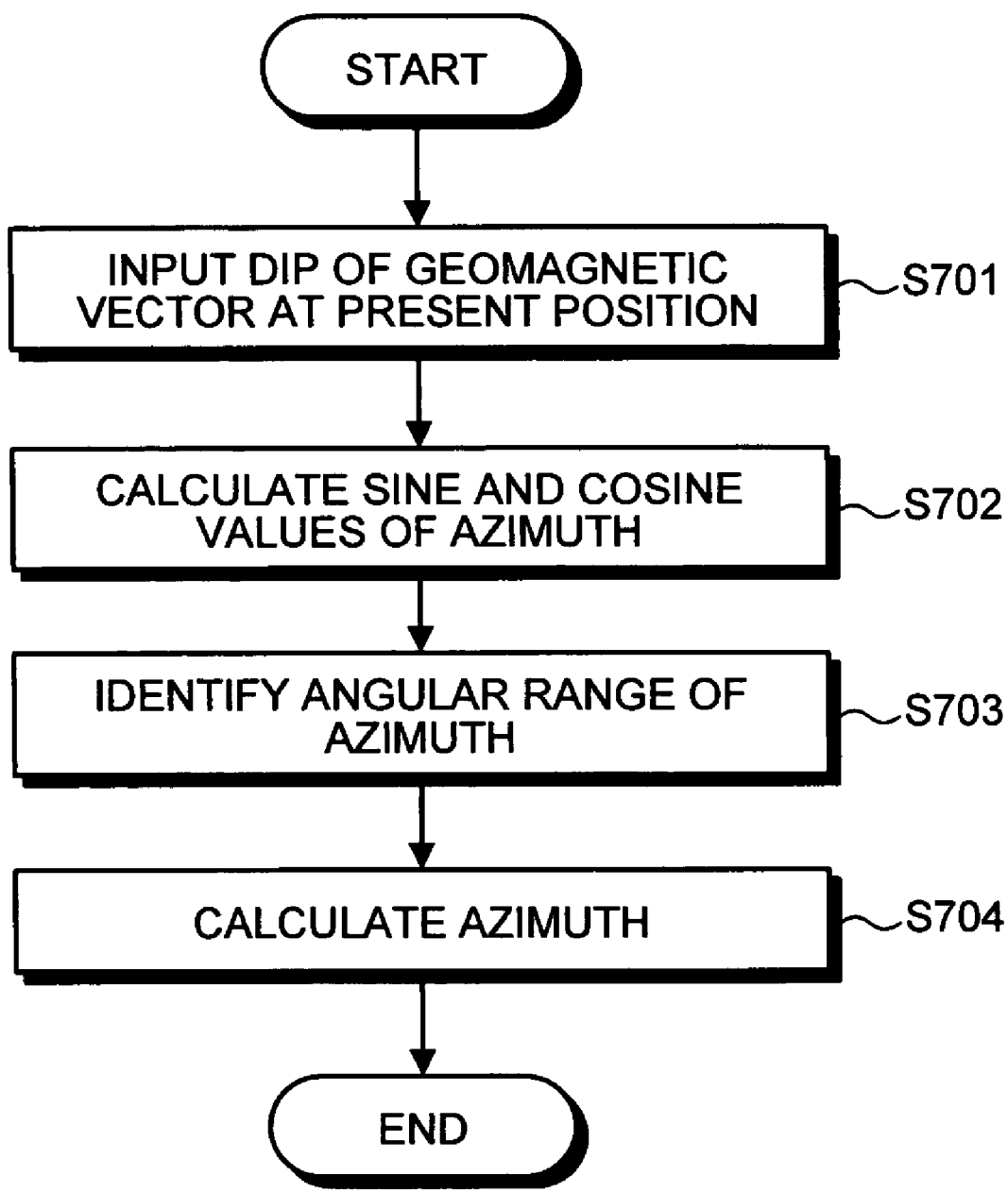
FIG. 7 is a flowchart of a process procedure for calculating a directional (hereinafter, "directional calculation procedure") (part 3)

FIG. 7 is a flowchart of a directional calculation procedure (part 3) according to the embodiment of the present invention. As shown in FIG. 7, at first, a dip I at the present position is input from an external server (step S701). Then, a sine value $\sin\theta$ and a cosine value $\cos\theta$ of an azimuth $\theta$ are calculated (step S702).

The calculation of the sine value $\sin\theta$ and the cosine value $\cos\theta$ is the same as that of the flowcharts in FIG. 5 and FIG. 6, and therefore, explanation thereof is omitted. An angular range of the azimuth $\theta$ is identified from the calculated sine value $\sin\theta$ and cosine value $\cos\theta$ (step S703). The azimuth $\theta$ is calculated from the angular range and the inverse function of the calculated sine value $\sin\theta$ or cosine value $\cos\theta$ (step S704). According to the process procedure, the dip I at the present position is acquired each time the azimuth $\theta$ at the present position is measured to allow precise measurement of direction.

Figure 8:
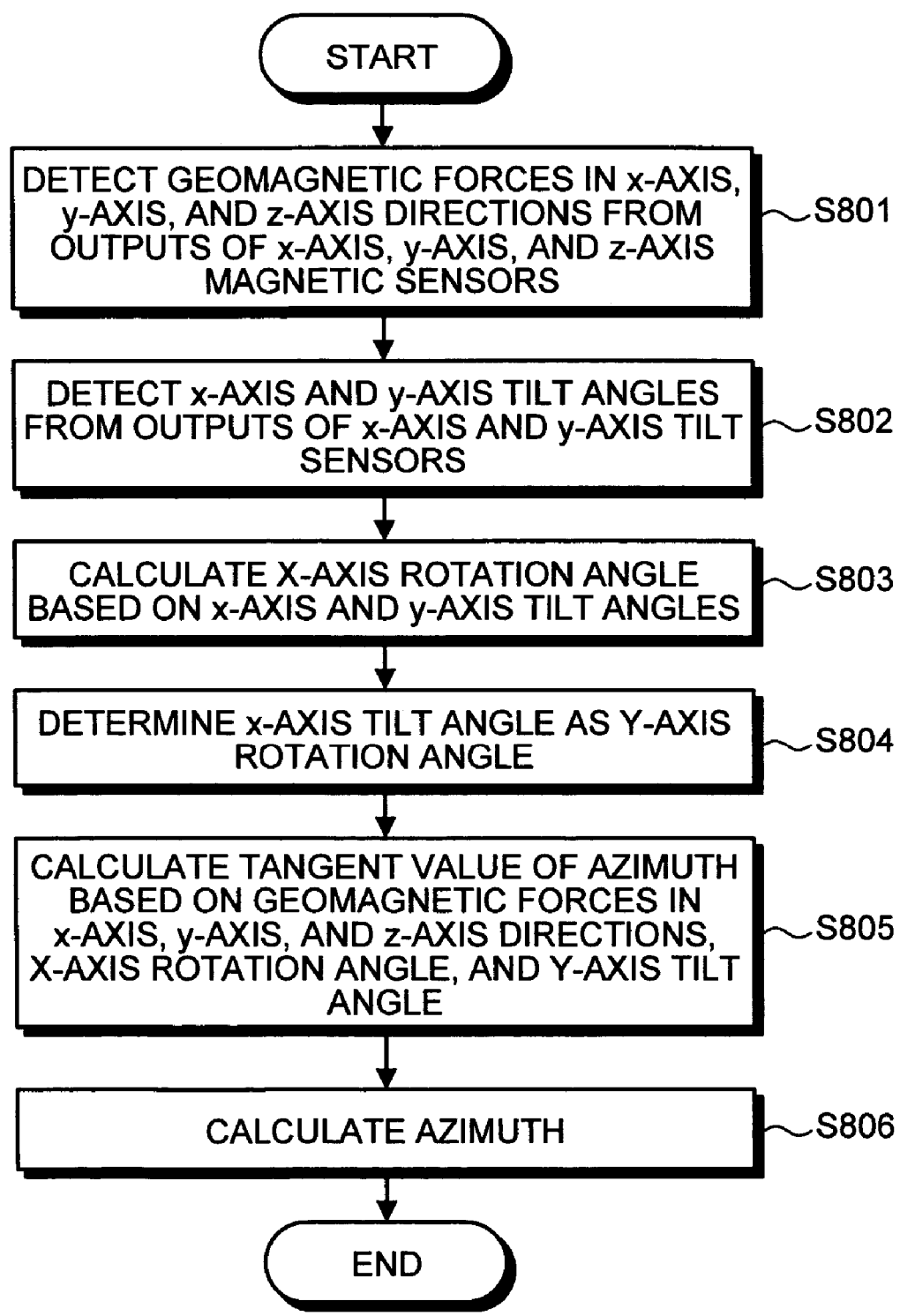
FIG. 8 is a flowchart of a process procedure for calculating a directional (hereinafter, "directional calculation procedure") (part 4)

FIG. 8 is a flowchart of a directional calculation procedure (part 4) according to the embodiment of the present invention. The dip I at the present position is assumed to be given. As shown in FIG. 8, at first, geomagnetic forces in the x-axis direction, y-axis direction, and the z-axis direction are detected from the outputs of the x-axis magnetic sensor 110, the y-axis magnetic sensor 111, and the z-axis magnetic sensor 112 (step S801).

Next, an x-axis tilt angle (pitch angle $\beta g$) and a y-axis tilt angle (roll angle $\alpha g$) are detected from the outputs of the x-axis tilt sensor 115 and the y-axis tilt sensor 116 (step S802). The X-axis rotation angle $\alpha$ is calculated, using the equation (15), based on the x-axis tilt angle (pitch angle $\beta g$) and the y-axis tilt angle (roll angle $\alpha g$) (step S803). The x-axis tilt angle (pitch angle $\beta g$) is determined, using the equation (13), as the Y-axis rotation angle $\beta$ that is a rotation angle when the x-axis is rotated around the Y-axis to be shifted to the horizontal plane 210 (step S804). A tangent value $\tan\theta$ of the azimuth $\theta$ is calculated based on the geomagnetic forces in the x-axis direction, y-axis direction, and the z-axis direction, the X-axis rotation angle $\alpha$, and the Y-axis rotation angle $\beta$ (step S805). The azimuth $\theta$ is calculated from the inverse function of the tangent value $\tan\theta$ (step S806).

The tangent value $\tan\theta$ of the azimuth $\theta$ is explained below. The following equation (30) is an equation of the tangent value $\tan\theta$ of the azimuth $\theta$ obtained from the equation (25) and equation (26).

$$\tan\theta = \frac{(\vec{y}'_H \times \cos\alpha + \vec{z}'_H \times \sin\alpha) \times \cos\beta}{\vec{x}'_H - \sin I \times \sin\beta} \tag{30}$$

According to the process procedure, only by detecting the geomagnetic forces in the x-axis direction, y-axis direction, and the z-axis direction, the x-axis tilt angle $\beta g$, and the y-axis tilt angle $\alpha g$, it is possible to calculate the azimuth $\theta$ of the body 120 using a simple computational equation.

The tangent value $\tan\theta$ of the azimuth $\theta$ can be expressed by the equation without using the dip by using the method as follows. More specifically, the sine value $\sin I$ of the dip I in the output components of the x-axis magnetic sensor 110 expressed by the equation (24) is solved to obtain the following equation (31).

$$\sin I = \frac{\vec{x}'_H - \cos\beta \times \cos\theta \times \cos I}{\sin\beta} \tag{31}$$

By using the equation (31), the cosine value $\cos I$ of the dip I in the output components of the y-axis magnetic sensor 111 expressed by the equation (24) is solved to obtain the following equation (32). Furthermore, the cosine value $\cos I$ of the dip I in the output components of the z-axis magnetic sensor 112 expressed by the equation (24) is solved to obtain the following equation (33).

$$\cos I = \frac{\vec{y}'_H \times \sin\beta + \vec{x}'_H \times \sin\alpha \times \cos\beta}{\cos\alpha \times \sin\beta \times \sin\theta + \sin\alpha \times \cos\theta} \tag{32}$$

$$\cos I = \frac{\vec{z}'_H \times \sin\beta - \vec{x}'_H \times \cos\alpha \times \cos\beta}{\sin\alpha \times \sin\beta \times \sin\theta - \cos\alpha \times \cos\theta} \tag{33}$$

The equation (31) to the equation (33) are combined and developed to obtain the following equation (34). The azimuth is calculated by the following equation (35) that expresses the inverse function of the equation (34).

$$\frac{\sin\theta}{\cos\theta} = \frac{\vec{y}'_H \times \cos\alpha + \vec{z}'_H \times \sin\alpha}{\vec{y}'_H \times \sin\alpha \times \sin\beta - \vec{z}'_H \cos\alpha \times \sin\beta - \vec{x}'_H \times \cos\beta} \tag{34}$$

$$\theta = \arctan\left(\frac{\vec{y}'_H \times \cos\alpha + \vec{z}'_H \times \sin\alpha}{\vec{y}'_H \times \sin\alpha \times \sin\beta - \vec{z}'_H \cos\alpha \times \sin\beta - \vec{x}'_H \times \cos\beta}\right) \tag{35}$$

The dip varies by the present position and the change with aging of the body 120. Furthermore, the dip can be input from an external server through the dip input unit 341. However, if the dip data in the server is not updated so often, the dip I is not included in the computational equation of the equation (34) or the equation (35), and therefore, dip-independent azimuth measurement can be realized with high precision.

Figure 9:
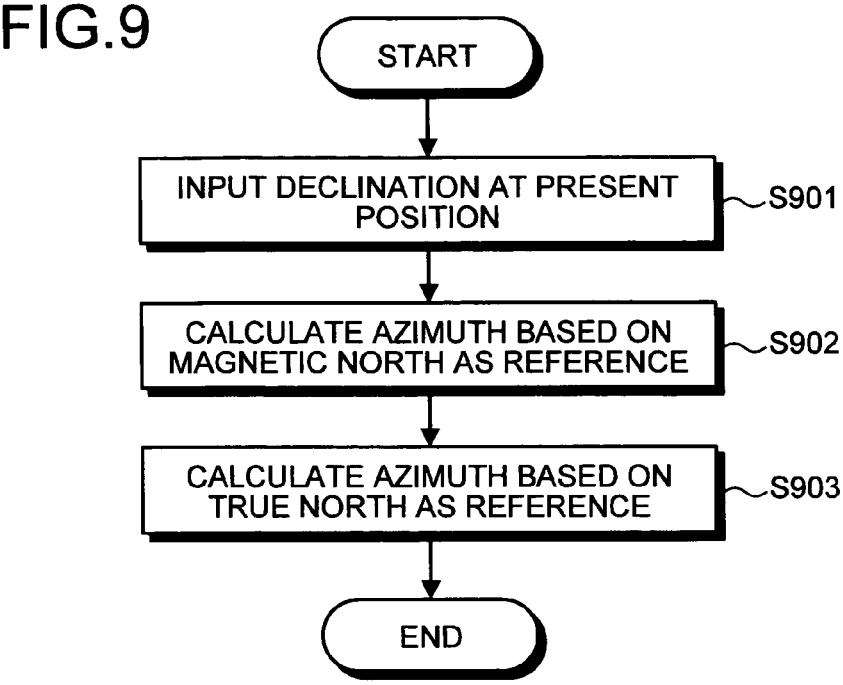
FIG. 9 is a flowchart of a process procedure for calculating a directional (hereinafter, "directional calculation procedure") (part 5)

FIG. 9 is a flowchart of a directional calculation procedure (part 5) according to the embodiment of the present invention. At first, a declination D at the present position is input (step S901). For the declination at the present position in Japan, the results of measurement of magnetism are disclosed as a table by the Geographical Survey Institute, and therefore, the declination D at any region is obtained by the table. The declination D is also obtained by using a declination calculating method of approximating it by a quadratic equation. More specifically, the declination D can be calculated using the following equation (36) to equation (38).

$$D_{2000.0} = 7°37.142' + 21.622'\Delta\phi - 7.672'\Delta\lambda + 0.442'\Delta\phi^2 - 0.32'\Delta\phi\Delta\lambda + 0.675'\Delta\lambda^2 \quad (36)$$

$$\Delta\phi = (\text{LATITUDE } \phi \text{ AT MEASURED POSITION}) - 37 \quad (37)$$

$$\Delta\lambda = (\text{LONGITUDE } \lambda \text{ AT MEASURED POSITION}) - 138 \quad (38)$$

Next, an azimuth θ based on magnetic north as a reference is calculated (step S902). The calculation procedure of the azimuth θ is the same as that of the flowcharts of FIG. 5 to FIG. 8, and therefore, explanation thereof is omitted. The azimuth θ is corrected by the declination D input to calculate an azimuth θ' based on true north as a reference (step S903). By performing the calculation procedure, the azimuth θ' can be calculated, which allows further higher-precision direction measurement to be performed.

Figure 10:
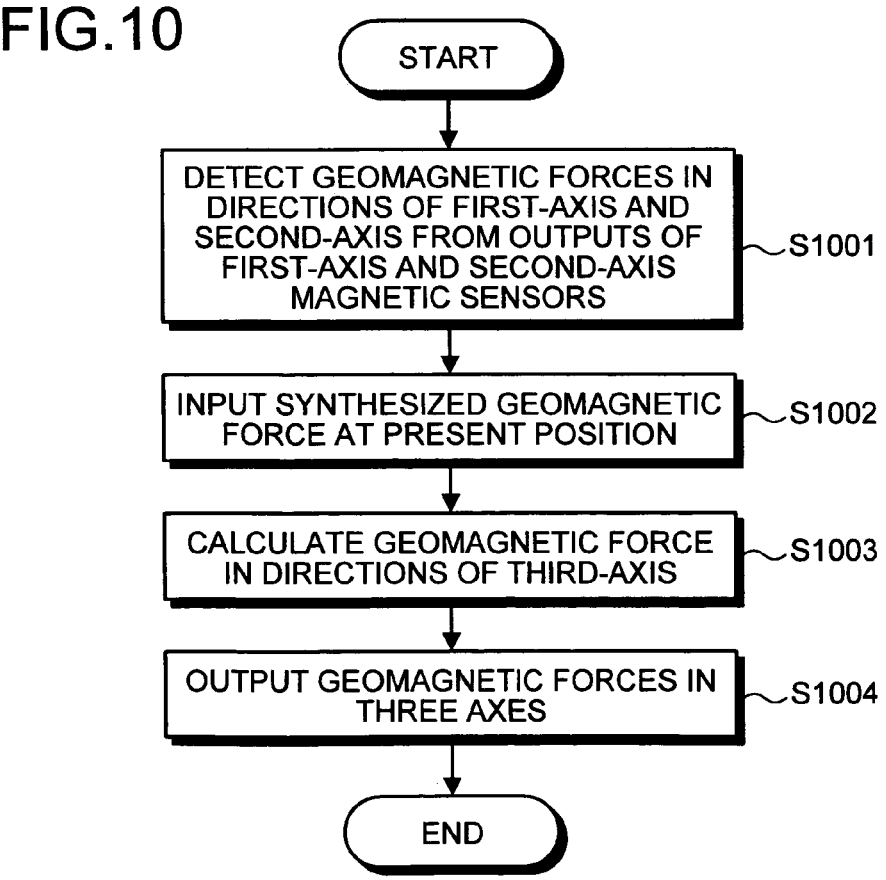
FIG. 10 is a flowchart of a process procedure for calculating a directional (hereinafter, "directional calculation procedure") (part 6)

FIG. 10 is a flowchart of a directional calculation procedure (part 6) according to the embodiment of the present invention. This directional calculation procedure includes measuring an azimuth θ by a so-called biaxial magnetic sensor. As one example, the y-axis is determined as a first axis, the z-axis as a second axis, and the x-axis as a third axis. The magnetic sensor is provided on the first axis and the second axis, but not provided on the third axis.

As shown in FIG. 10, at first, geomagnetic forces in the directions of the first axis and the second axis are detected from outputs of the first axis and second axis magnetic sensors (step S1001). A total geomagnetic force at the present position is input (step S1002). The total geomagnetic force F in each region in Japan can be approximated by the following equation (39) to equation (41).

$$F_{2000.0} = 47505.3881 + 567.453\Delta\phi - 294.499\Delta\lambda - 0.225\Delta\phi^2 - 2.975\Delta\phi\Delta\lambda + 1.291\Delta\lambda^2 \quad (39)$$

$$\Delta\phi = (\text{LATITUDE } \phi \text{ AT MEASURED POSITION}) - 37 \quad (40)$$

$$\Delta\lambda = (\text{LONGITUDE } \lambda \text{ AT MEASURED POSITION}) - 138 \quad (41)$$

Next, a geomagnetic force in the direction of the third axis is calculated (step S1003). The geomagnetic force in the third axis direction can be calculated at this step by the following equation (42) to equation (44).

$$\vec{x}'_H = \frac{\vec{x}_H}{|S'_h|} \quad (42)$$

$$\vec{y}'_H = \frac{\vec{y}_H}{|S'_h|} \quad (43)$$

$$\vec{z}'_H = \sqrt{1 - (\vec{x}'^2_H + \vec{y}'^2_H)} \quad (44)$$

where $\vec{x}'_H, \vec{y}'_H$: VALUES OBTAINED BY NORMALIZING OUTPUT VALUES OF x-AXIS AND y-AXIS MAGNETIC SENSORS BY S'h $\vec{x}_H, \vec{y}_H$: OUTPUT VALUES OF x-AXIS AND y-AXIS MAGNETIC SENSORS $|S'_h|$: OUTPUT VALUE OF MAGNETIC SENSOR CORRESPONDING TO TOTAL GEOMAGNETIC FORCE F.

The calculated geomagnetic force of the third axis is output (step S1004). The steps thereafter are the same as those in FIG. 5 to FIG. 9, and therefore, explanation thereof is omitted. According to this procedure, the biaxial magnetic sensor is capable of measuring directions with high precision in the same manner as that of the triaxial magnetic sensor. Furthermore, it is possible to reduce the number of components, minimize, and reduce its weight, thus providing the directional measuring device 100 at a low cost.

A comparative example between the directional measuring device 100 and a conventional directional measuring device is explained below. The following table 1 compares azimuths of the directional measuring device 100 with those of the conventional directional measuring device with respect to set angles. The comparison is made based on the conditions of a roll angle αg=20° and a pitch angle βg=20°. The following values are also given in the table 1. That is, the values include normalized geomagnetic output values in the respective axes of the directional measuring device 100 and tangent values of the azimuths θ calculated from the rotation angles.

TABLE 1

| Angle θ | Output of x-axis magnetic sensor | Output of y-axis magnetic sensor | Output of z-axis magnetic sensor | Normalized output of x-axis magnetic sensor $\vec{x}_H$ | Normalized output of y-axis magnetic sensor $\vec{y}_H$ | Normalized output of z-axis magnetic sensor $\vec{z}_H$ | Direction tangent | Azimuth of conventional technology | Azimuth of present invention |
|---|---|---|---|---|---|---|---|---|---|
| 0  | 221.2 | 41.1  | −117.7 | 0.37 | −0.33 | −0.86 | 0.01 | 353.4 | 0.7  |
| 10 | 215.7 | 67.4  | −128.6 | 0.35 | −0.23 | −0.90 | 0.17 | 2.5   | 9.5  |
| 20 | 206.6 | 100.7 | −136.0 | 0.32 | −0.11 | −0.92 | 0.37 | 13.7  | 20.3 |
| 30 | 197.1 | 130.5 | −145.6 | 0.29 | −0.01 | −0.96 | 0.58 | 24.0  | 30.3 |
| 40 | 178.3 | 154.7 | −149.4 | 0.22 | 0.08  | −0.97 | 0.83 | 33.6  | 39.8 |
| 50 | 156.7 | 181.1 | −150.3 | 0.14 | 0.17  | −0.97 | 1.20 | 44.2  | 50.1 |

TABLE 1-continued

| Angle θ | Output of x-axis magnetic sensor | Output of y-axis magnetic sensor | Output of z-axis magnetic sensor | Normalized output of x-axis magnetic sensor $\vec{x}_n$ | Normalized output of y-axis magnetic sensor $\vec{y}_n$ | Normalized output of z-axis magnetic sensor $\vec{z}_n$ | Direction tangent | Azimuth of conventional technology | Azimuth of present invention |
|---|---|---|---|---|---|---|---|---|---|
| 60 | 133.3 | 198.7 | −145.7 | 0.06 | 0.23 | −0.96 | 1.66 | 53.5 | 58.9 |
| 70 | 106.7 | 214.0 | −145.6 | −0.03 | 0.29 | −0.96 | 2.56 | 63.0 | 68.7 |
| 80 | 77.9 | 226.1 | −136.3 | −0.14 | 0.33 | −0.92 | 4.89 | 73.1 | 78.4 |
| 90 | 46.8 | 235.0 | −126.9 | −0.25 | 0.36 | −0.89 | 46.50 | 83.6 | 88.8 |
| 100 | 14.3 | 233.6 | −116.9 | −0.36 | 0.36 | −0.85 | −5.94 | 94.1 | 99.5 |
| 110 | −11.6 | 229.9 | −104.0 | −0.45 | 0.34 | −0.81 | −2.98 | 103.1 | 108.5 |
| 120 | −39.4 | 220.3 | −90.9 | −0.55 | 0.31 | −0.76 | −1.82 | 113.2 | 118.8 |
| 130 | −64.4 | 207.8 | −74.4 | −0.64 | 0.27 | −0.70 | −1.24 | 123.2 | 128.8 |
| 140 | −86.7 | 190.4 | −56.4 | −0.72 | 0.20 | −0.64 | −0.86 | 133.5 | 139.2 |
| 150 | −104.0 | 167.1 | −43.0 | −0.78 | 0.12 | −0.59 | −0.59 | 143.3 | 149.4 |
| 160 | −118.8 | 143.8 | −29.1 | −0.83 | 0.04 | −0.54 | −0.38 | 152.7 | 159.1 |
| 170 | −127.6 | 112.8 | −16.1 | −0.86 | −0.07 | −0.50 | −0.18 | 163.2 | 169.9 |
| 180 | −125.7 | 85.2 | −0.3 | −0.86 | −0.17 | −0.44 | 0.00 | 172.8 | 179.8 |
| 190 | −123.7 | 56.7 | 10.8 | −0.85 | −0.27 | −0.40 | 0.17 | 182.2 | 189.6 |
| 200 | −117.9 | 23.3 | 18.1 | −0.83 | −0.39 | −0.38 | 0.37 | 192.8 | 200.4 |
| 210 | −106.2 | −5.9 | 26.1 | −0.79 | −0.49 | −0.35 | 0.59 | 202.6 | 210.6 |
| 220 | −85.7 | −28.8 | 28.3 | −0.72 | −0.57 | −0.34 | 0.85 | 211.9 | 220.2 |
| 230 | −68.1 | −53.5 | 27.3 | −0.65 | −0.66 | −0.34 | 1.17 | 221.2 | 229.5 |
| 240 | −43.0 | −72.5 | 28.1 | −0.56 | −0.73 | −0.34 | 1.71 | 230.9 | 239.7 |
| 250 | −12.1 | −88.5 | 21.6 | −0.45 | −0.79 | −0.36 | 2.88 | 242.0 | 250.9 |
| 260 | 15.4 | −100.5 | 15.6 | −0.36 | −0.83 | −0.38 | 6.06 | 251.6 | 260.6 |
| 270 | 46.2 | −110.5 | 8.5 | −0.25 | −0.86 | −0.41 | −55.14 | 261.9 | 271.0 |
| 280 | 73.8 | −109.1 | −3.8 | −0.15 | −0.86 | −0.45 | −5.46 | 271.3 | 280.4 |
| 290 | 105.5 | −106.2 | −19.4 | −0.04 | −0.85 | −0.51 | −2.57 | 282.4 | 291.3 |
| 300 | 132.0 | −99.5 | −33.3 | 0.06 | −0.82 | −0.56 | −1.68 | 292.1 | 300.7 |
| 310 | 155.7 | −81.8 | −46.1 | 0.14 | −0.76 | −0.60 | −1.15 | 302.2 | 311.0 |
| 320 | 179.9 | −64.2 | −63.6 | 0.23 | −0.70 | −0.67 | −0.79 | 313.1 | 321.6 |
| 330 | 195.6 | −44.4 | −76.9 | 0.28 | −0.63 | −0.71 | −0.57 | 322.2 | 330.4 |
| 340 | 208.1 | −20.1 | −90.6 | 0.33 | −0.54 | −0.76 | −0.37 | 331.8 | 339.8 |
| 350 | 217.8 | 9.0 | −107.7 | 0.36 | −0.44 | −0.82 | −0.17 | 342.9 | 350.5 |
| 360 | 219.1 | 37.8 | −117.5 | 0.37 | −0.34 | −0.86 | 0.00 | 352.4 | 359.8 |

In the table 1, the normalized outputs of from the x-axis magnetic sensor to the z-axis magnetic sensor include normalized values and directions of geomagnetic vectors in the respective axes. Positive and negative output values represent directions of the geomagnetic vectors of the respective axes.

It is understood from the results of the table 1 that slightly smaller values are shown with respect to the set angles in the conventional technology and that a numerical deviation ranging from about −9° to about −7° occurs. The deviation angle has a tendency to increase as an increase in the roll angle αg and the pitch angle βg. On the contrary, the azimuth θ calculated in the present invention is substantially identical to the relevant set azimuth θ, and it is therefore understood that no deviation angle occurs substantially.

Figure 11:
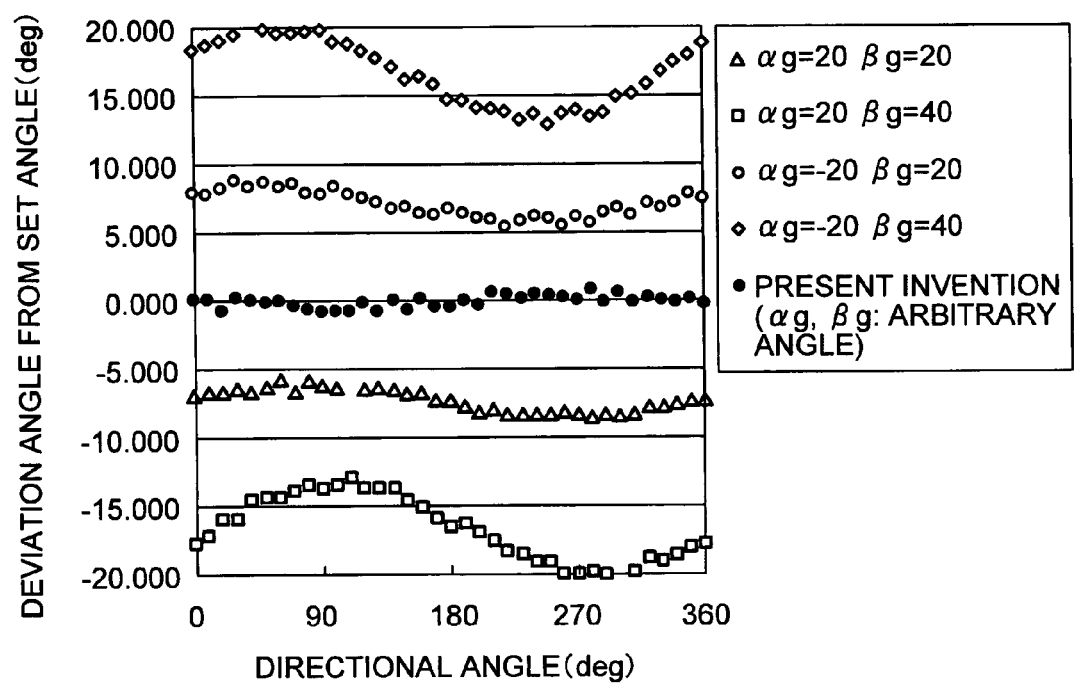
FIG. 11 is a diagram to explain the difference between the directional angles when the directional measuring device of the present invention and the conventional directional measuring device are used.

Furthermore, detailed comparison is made between the embodiment of the present invention and the conventional technology. FIG. 11 is a diagram of comparison between deviations of the directional angles when the directional measuring device 100 of the present invention and the conventional directional measuring device are used. Since the directional measuring device 100 is thought to be used or to be held by the users in various ways, azimuths calculated in each case where the tilt angle is changed to various values were compared with each other. The x-axis in the figure represents a set azimuth, and the y-axis represents a deviation of respective calculated azimuths by the directional measuring device 100 of the present invention and the conventional directional measuring device from a set azimuth. As shown in FIG. 11, void triangle, rectangle, circle, and rhomboid represent deviation angles from the set angles when the roll angle αg and the pitch angle βg are changed in the conventional technology, and black circles represent a deviation angle from the set angle in the present invention.

As is clear from FIG. 11, positive deviation and negative deviation occur depending on the tilt angle in the conventional technology. Furthermore, if the tilt angle becomes larger, the deviation angle becomes larger. The deviation angle becomes larger, for example, in the case of the void rectangles (αg=40°, βg=20°) as compared to the void triangles (αg=20°, βg=20°). On the other hand, in the embodiment of the present invention, the results measured under the condition of αg=40° and βg=20° are shown in FIG. 11 in which the deviation angle from the set angle is almost zero. It is therefore understood from the results that calculation is performed with high precision even if the tilt angle becomes larger.

In the explanation with reference to the embodiment, normalization is performed by an output value Sh of the magnetic sensors 110 to 112 corresponding to a total geomagnetic force F. The total geomagnetic force F can also be calculated by detecting the horizontal component of geomagnetism and the dip I. According to this, the maximum value of the output when the directional measuring device 100 is rotated once along the horizontal plane 210 corresponds to the horizontal component of the geomagnetism. Therefore, output values Sh of the magnetic sensors 110 to 112 corresponding to the total geomagnetic force F can also be calculated from the output.

In the embodiment, the acceleration sensor is used as the tilt sensors 115 to 117, but the sensor is not limited to the acceleration sensor if any tilt sensor can measure an angle between the horizontal plane 210 and the respective axes.

In the embodiment, the measuring method used in Japan has been explained, but it is not limited to the measuring method. If a latitude and a longitude of a measured position are given in any region all over the world, it is possible to obtain the declination, total geomagnetic force, or the dip. The information for the declination D, total geomagnetic force F, and the dip I are prepared in advance as database by acquiring the latitude and the longitude, which allows acquisition of the declination, total geomagnetic force, and the dip at any region all over the world.

Furthermore, the calculation equation is not limited to that in the above embodiment, and therefore, the users can use any of methods as follows to acquire the calculation equation. The methods include a method of directly inputting the declination D by the user to perform calculation, and a method of automatically acquiring position information through communications, radio waves, or GPS to calculate it with a measurement equation. The methods also include a method of automatically acquiring it through access to a server, on a network, including a table in which position information correlates with declination, total geomagnetic force, and dip.

Furthermore, in the embodiment, the explanation is given based on an integrated circuit (IC) module, but it is not limited to this. Therefore, the directional measuring device 100 including a display unit and a power source and operating as a single unit may be used. Alternatively, the directional measuring device 100 may be incorporated in any of electronic devices. Further, all the hardware components as shown in FIG. 1 are not necessarily integrated into one unit, but, for example, the measurement may be performed by a CPU or a microcomputer in the device including the directional measuring device 100.

In the embodiment, data for the declination D, the total geomagnetic force F, and the dip I can be acquired from the latitude and the longitude of the present position. Therefore, the user can freely select or combine the data. Even if the user does not select the data, initial values of the data can be stored in the directional measuring device 100 to measure a direction using them.

Furthermore, in the embodiment, a total output value Wg has been calculated with a square root of a squared sum of the output values of the acceleration sensors in the respective axes by using the triaxial acceleration sensor as the tilt sensors 115 to 117 in the three axes. However, since the gravity acceleration g corresponds to the total output value Wg, the total output value may be used. In this case, by calculating the total output value Wg, an acceleration in the measurement is obtained. Furthermore, by comparing the acceleration with the known gravity acceleration, information as to whether any acceleration factor other than the gravity acts is also obtained, and therefore, correction may be performed using the information. Moreover, the tilt sensors 115 to 117 may be configured not with three axes but with two axes. In this case, by inputting the total output value Wg corresponding to the gravity acceleration, a tilt angle of the respective axes can be calculated.

It is assumed that the directional measuring device 100 is used and held by the users in various ways, and it is quite possible that the directional measuring device 100, i.e., the magnetic sensors 110 to 112 may be used even when they are tilted with respect to the horizontal plane 210. In such a case also, it is possible to calculate the azimuth θ with high precision even in a state where the body 120 is tilted. Particularly, the present invention is effective in cell phones, portable information terminals such as PDA, and wrist watches. Furthermore, the algorism used in the directional measuring device 100 is simple to make it easy to be incorporated in various devices.

As explained above, according to the directional measuring device and method and the direction measuring program, by using the simple computational equation based on the coordinate system for rotations three times such that rotation is performed in the order of the X-axis, the Y-axis, and the Z-axis, it is possible to simply measure a direction with high precision.

The direction measuring method according to the embodiment of the present invention is realized by executing the previously prepared program on a computer such as a personal computer and a work station. The program is recorded in a computer-readable recording medium such as a hard disk, a flexible disk, a compact disk-read only memory (CD-ROM), a magneto-optic disk (MO), and a digital versatile disk (DVD). The program is then executed by being read out from the recording medium by the computer. Furthermore, the program may be a transmission medium capable of being distributed through a network such as the Internet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A directional measuring device that measures a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, comprising:

an x-axis geomagnetic force detector that detects a geomagnetic force along the x-axis;

an x-axis tilt angle detector that detects an x-axis tilt angle that is an angle between the horizontal plane and the x-axis;

a y-axis geomagnetic force detector that detects a geomagnetic force along a y-axis that is orthogonal to the x-axis;

a z-axis geomagnetic force detector that detects a geomagnetic force along a z-axis that is orthogonal to both the x-axis and the y-axis;

a y-axis tilt angle detector that detector detects a y-axis tilt angle that is angle between the horizontal plane and the y-axis;

a determining unit that determines the x-axis tilt angle as a rotation angle that is an angle by which the x-axis needs to be rotated around the Y-axis so as to be in the horizontal plane;

a rotation angle calculator that calculates a rotation angle based on both the x-axis tilt angle and the y-axis tilt angle wherein the rotation angle is an angle by which the y-axis needs to be rotated around the X-axis so as to be in the horizontal plane when the x-axis is rotated by the x-axis by the x-axis tilt angle around the Y-axis so as to be in the horizontal plane to cause the y-axis to rotate following rotation of the x-axis, and an azimuth calculator that calculates an azimuth of the body based on the geomagnetic force and the rotation angle wherein the azimuth calculator calculates an azimuth of the body based on the geomagnetic forces detected by both the y-axis geomagnetic force detector and the z-axis geomagnetic force detector and the rotation angle calculated, and the rotation angle calculator calculates the rotation angle based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where $\alpha$ is a rotation angle around the X-axis, $\beta$ is an x-axis tilt angle as a rotation angle around the Y-axis, and $\theta$ is a rotation angle around the Z-axis as an azimuth of the body.

2. The directional measuring device according to claim 1, wherein the azimuth calculator further comprises:
a sine calculator that calculates sine of the azimuth of the body based on the geomagnetic forces detected by both the y-axis geomagnetic force detector and the z-axis geomagnetic force detector and the rotation angle calculated by the rotation angle calculator;
a cosine calculator that calculates cosine of the azimuth of the body based on the geomagnetic force detected by the x-axis geomagnetic force detector and the rotation angle determined by the determining unit; and
an identifying unit that identifies an angular range of the azimuth based on the sine and the cosine of the azimuth,
wherein the azimuth calculator calculates the azimuth based on one among the sine and the cosine of the azimuth and a tangent value, and of the angular range identified by the identifying unit, the tangent being obtained from the sine and the cosine.

3. The directional measuring device according to claim 1, wherein the azimuth angle calculator further comprises:
a dip input unit that receives a dip between a geomagnetic vector at a present position of the body and the horizontal plane, wherein
the azimuth calculator calculates the azimuth based on the dip.

4. The directional measuring device according to claim 1, wherein the azimuth angle calculator further comprises:
a declination input unit that receives a declination between the magnetic north at a present position of the body and the true north, wherein
the azimuth calculator calculates the azimuth based on the declination.

5. A directional measuring device that measures a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, comprising:
a y-axis geomagnetic force detector that detects a geomagnetic force along a y-axis that is orthogonal to the x-axis;
a z-axis geomagnetic force detector that detects a geomagnetic force along a z-axis that is orthogonal to both the x-axis and the y-axis;
an x-axis tilt angle detector that detects an x-axis tilt angle that is an angle between the horizontal plane and the x-axis;
a y-axis tilt angle detector that detects a y-axis tilt angle that is angle between the horizontal plane and the y-axis;
a rotation angle calculator that calculates a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis; and
an azimuth calculator that calculates an azimuth of the body based on the geomagnetic forces detected by both the y-axis geomagnetic force detector and the z-axis geomagnetic force detector and the rotation angle
where the rotation angle calculator calculates the rotation angle based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where $\alpha$ is a rotation angle around the X-axis, $\beta$ is an x-axis tilt angle as a rotation angle around the Y-axis, and $\theta$ is a rotation angle around the Z-axis as an azimuth of the body.

6. The directional measuring device according to claim 5, wherein the azimuth angle calculator further comprises:
a dip input unit that receives a dip between a geomagnetic vector at a present position of the body and the horizontal plane, wherein
the azimuth calculator calculates the azimuth based on the dip.

7. The directional measuring device according to claim 5, wherein the azimuth angle calculator further comprises:
a declination input unit that receives a declination between the magnetic north at a present position of the body and the true north, wherein
the azimuth calculator calculates the azimuth based on the declination.

8. A directional measuring device that measures a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, comprising:
a y-axis geomagnetic force detector that detects a geomagnetic force along a y-axis that is orthogonal to the x-axis;
a z-axis geomagnetic force detector that detects a geomagnetic force along a z-axis that is orthogonal to both the x-axis and the y-axis;
a total geomagnetic force input unit that receives a total geomagnetic force at a present position of the body, wherein the total geomagnetic force is a vector addition of geomagnetic forces along the X-axis, the Y-axis, and the Z-axis;
a geomagnetic force calculator that calculates a geomagnetic force along the x-axis based on the total geomagnetic force and the geomagnetic forces along both the y-axis and the z-axis;

an x-axis tilt angle detector that detects an x-axis tilt angle that is an angle between the horizontal plane and the x-axis;

a y-axis tilt angle detector that detects a y-axis tilt angle that is angle between the horizontal plane and the y-axis;

a determining unit that determines the x-axis tilt angle as a rotation angle that is an angle by which the x-axis needs to be rotated around the Y-axis so as to be in the horizontal plane;

a rotation angle calculator that calculates a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis and an azimuth calculator that calculates an azimuth of the body based on the geomagnetic force along the x-axis and the rotation angle wherein the azimuth calculator calculates an azimuth of the body based on the geomagnetic forces detected by both the y-axis geomagnetic force detector and the z-axis geomagnetic force detector and the rotation angle calculated, and the rotation angle calculator calculates the rotation angle based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where $\alpha$ is a rotation angle around the X-axis, $\beta$ is an x-axis tilt angle as a rotation angle around the Y-axis, and $\theta$ is a rotation angle around the Z-axis as an azimuth of the body.

9. A directional measuring device that measures a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, comprising:

a first-axis geomagnetic force detector that detects a geomagnetic force along a first axis from among the x-axis, a y-axis that is orthogonal to the x-axis, and a z-axis that is orthogonal to both the x-axis and the y-axis;

a second-axis geomagnetic force detector that detects a geomagnetic force along a second axis other than the first axis from among the x-axis, the y-axis, and the z-axis;

a total geomagnetic force input unit that receives a total geomagnetic force at a present position of the body, wherein the total geomagnetic force is a vector addition of geomagnetic forces along the X-axis, the Y-axis, and the Z-axis;

a geomagnetic force calculator that calculates a geomagnetic force along an axis other than the first axis and the second axis, from among the x-axis, the y-axis, and the z-axis based on the total geomagnetic force and the geomagnetic forces along both the first axis and the second axis;

an x-axis tilt angle detector that detects an x-axis tilt angle that is an angle between the horizontal plane and the x-axis;

a y-axis tilt angle detector that detects a y-axis tilt angle that is an angle between the horizontal plane and the y-axis;

a rotation angle calculator that calculates a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis; and an azimuth calculator that calculates an azimuth of the body based on the geomagnetic forces along the y-axis and the z-axis and the rotation angle wherein the rotation angle calculator calculates the rotation angle based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where $\alpha$ is a rotation angle around the X-axis, $\beta$ is an x-axis tilt angle as a rotation angle around the Y-axis, and $\theta$ is a rotation angle around the Z-axis as an azimuth of the body.

10. A directional measuring method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, comprising:

detecting a geomagnetic force along the x-axis;

detecting an x-axis tilt angle that is an angle between the horizontal plane and the x-axis;

detecting a geomagnetic force along a y-axis is orthogonal to the x-axis;

detecting a geomagnetic force along a z-axis that is orthogonal to both the x-axis and the y-axis';

detecting a y-axis tilt angle that is angle between the horizontal plane and the y-axis;

determining the x-axis tilt angle as a rotation angle that is an angle by which the x-axis needs to be rotated around the Y-axis so as to be in the horizontal plane;

calculating a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt around the Y-axis so as to be in the horizontal plane to cause the y-axis to rotate following rotation to the x-axis and calculating an azimuth of the body based on the geomagnetic force and the rotation angle, wherein the step of calculating the azimuth includes calculating the azimuth of the body based on the geomagnetic forces along both the y-axis and the z-axis and the rotation angle calculated, and the calculating the rotation angle includes calculating the rotation angle based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where $\alpha$ is a rotation angle around the X-axis, $\beta$ is an x-axis tilt angle as a rotation angle around the Y-axis, and $\theta$ is a rotation angle around the Z-axis as an azimuth of the body.

11. The directional measuring method according to claim 10, wherein the calculating the azimuth includes:
    calculating sine of the azimuth of the body based on the geomagnetic forces along both the y-axis and the z-axis and the rotation angle calculated;
    calculating cosine of the azimuth of the body based on the geomagnetic force along the x-axis and the rotation angle determined;
    identifying an angular range of the azimuth based on the sine and the cosine of the azimuth; and
    calculating the azimuth based on one among the sine and the cosine of the azimuth and tangent, and the angular range of the azimuth identified, the tangent being obtained from the sine and the cosine.

12. The directional measuring method according to claim 10, wherein the step of calculating the azimuth angle includes:
    receiving a dip between a geomagnetic vector at a present position of the body and the horizontal plane, wherein the calculating the azimuth includes calculating the azimuth based on the dip.

13. The directional measuring method according to claim 10, wherein the step of calculating the azimuth angle includes:
    receiving a declination between the magnetic north at a present position of the body and the true north, wherein the calculating the azimuth includes calculating the azimuth based on the declination.

14. A directional measuring method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, comprising:
    detecting a geomagnetic force along a y-axis that is orthogonal to the x-axis;
    detecting a geomagnetic force along a z-axis that is orthogonal to both the x-axis and the y-axis;
    detecting an x-axis tilt angle that is an angle between the horizontal plane and the x-axis;
    detecting a y-axis tilt angle that is angle between the horizontal plane and the y-axis;
    calculating a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis; and
    calculating an azimuth of the body based on the geomagnetic forces detected along both the y-axis and the z-axis and the rotation angle wherein the step of calculating the rotation angle includes calculating the rotation angle, based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where $\alpha$ is a rotation angle around the X-axis, $\beta$ is an x-axis tilt angle as a rotation angle around the Y-axis, and $\theta$ is a rotation angle around the Z-axis as an azimuth of the body.

15. The directional measuring method according to claim 14, wherein the step of calculating the azimuth angle includes:
    receiving a dip between a geomagnetic vector at a present position of the body and the horizontal plane, wherein the calculating the azimuth includes calculating the azimuth based on the dip.

16. The directional measuring method according to claim 14, wherein the step of calculating the azimuth angle includes:
    receiving a declination between the magnetic north at a present position of the body and the true north, wherein the calculating the azimuth includes calculating the azimuth based on the declination.

17. A directional measuring method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, comprising:
    detecting a geomagnetic force along a y-axis that is orthogonal to the x-axis;
    detecting a geomagnetic force along a z-axis that is orthogonal to both the x-axis and the y-axis;
    receiving a total geomagnetic force at a present position of the body, wherein the total geomagnetic force is a vector addition of geomagnetic forces along the X-axis, the Y-axis, and the Z-axis;
    calculating a geomagnetic force along the x-axis based on the total geomagnetic force and the geomagnetic forces along both the y-axis and the z-axis;
    detecting an x-axis tilt angle that is an angle between the horizontal plane and the x-axis;
    detecting a y-axis tilt angle that is angle between the horizontal plane and the y-axis;
    determining the x-axis tilt angle as a rotation angle that is an angle by which the x-axis needs to be rotated around the Y-axis so as to be in the horizontal plane;
    calculating a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the axis: and
    calculating an azimuth of the body based on the geomagnetic force along the x-axis and the rotation angle wherein
    the azimuth calculating step includes calculating an azimuth of the body based on the geomagnetic forces along both the y-axis and the z-axis and the rotation angle calculated, and the calculating the rotation angle step includes calculating the rotation angle based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where α is a rotation angle around the X-axis, β is an x-axis tilt angle as a rotation angle around the Y-axis, and θ is a rotation angle around the Z-axis as an azimuth of the body.

18. A directional measuring method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, comprising:
  detecting a geomagnetic force along a first axis from among the x-axis, a y-axis that is orthogonal to the x-axis, and a z-axis that is orthogonal to both the x-axis and the y-axis;
  detecting a geomagnetic force along a second axis other than the first axis from among the x-axis, the y-axis, and the z-axis;
  receiving a total geomagnetic force at a present position of the body, wherein the total geomagnetic force is a vector addition of geomagnetic forces along the X-axis, the Y-axis, and the Z-axis;
  calculating a geomagnetic force along an axis other than the first axis and the second axis, from among the x-axis, the y-axis, and the z-axis based on the total geomagnetic force and the geomagnetic forces along both the first axis and the second axis;
  detecting an x-axis tilt angle that is an angle between the horizontal plane and the x-axis;
  detecting a y-axis tilt angle that is an angle between the horizontal plane and the y-axis;
  calculating a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis; and
  calculating an azimuth of the body based on the geomagnetic forces along the y-axis and the z-axis and the rotation angle wherein
  the rotation angle calculating step includes calculating the rotation angle based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where α is a rotation angle around the X-axis, β is an x-axis tilt angle as a rotation angle around the Y-axis, and θ is a rotation angle around the Z-axis as an azimuth of the body.

19. A computer program that realizes on a computer a directional measuring method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, the computer program making the computer execute:
  detecting a geomagnetic force along the x-axis;
  detecting an x-axis tilt angle that is an angle between the horizontal plane and the x-axis;
  detecting a geomagnetic force along a y-axis that is orthogonal to the x-axis;
  detecting a geomagnetic force along a z-axis that is orthogonal to both the x-axis and the y-axis;
  determining the x-axis tilt angle as a rotation angle that is an angle by which the x-axis needs to be rotated around the Y-axis so as to be in the horizontal plane;
  calculating a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis and
  calculating an azimuth of the body based on the geomagnetic force and the rotation angle wherein
  the calculating the azimuth step includes calculating the azimuth of the body based on the geomagnetic forces along both the y-axis and the z-axis and the rotation angle calculated, and the calculating the rotation angle step includes calculating the rotation angle based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where α is a rotation angle around the X-axis, β is an x-axis tilt angle as a rotation angle around the Y-axis, and θ is a rotation angle around the Z-axis as an azimuth of the body.

20. A computer program that realizes on a computer a directional measuring method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, the computer program making the computer execute:
  detecting a geomagnetic force along a y-axis that is orthogonal to the x-axis;
  detecting a geomagnetic force along a z-axis that is orthogonal to both the x-axis and the y-axis;
  detecting an x-axis tilt angle that is an angle between the horizontal plane and the x-axis;
  detecting a y-axis tilt angle that is angle between the horizontal plane and the y-axis;

calculating a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis; and calculating an azimuth of the body based on the geomagnetic forces detected along both the y-axis and the z-axis and the rotation angle wherein the calculating the rotation angle step includes calculating the rotation angle based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where $\alpha$ is a rotation angle around the X-axis, $\beta$ is an x-axis tilt angle as a rotation angle around the Y-axis, and $\theta$ is a rotation angle around the Z-axis as an azimuth of the body.

21. A computer program product that records a computer program for realizing on a computer a directional measuring method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, the computer program making the computer execute:

detecting a geomagnetic force along a y-axis that is orthogonal to the x-axis;

detecting a geomagnetic force along a z-axis that is orthogonal to both the x-axis and the y-axis;

receiving a total geomagnetic force at a present position of the body, wherein the total geomagnetic force is a vector addition of geomagnetic forces along the X-axis, the Y-axis, and the Z-axis;

calculating a geomagnetic force along the x-axis based on the total geomagnetic force and the geomagnetic forces along both the y-axis and the z-axis;

detecting a y-axis tilt angle that is angle between the horizontal plane and the y-axis;

determining the x-axis tilt angle as a rotation angle that is an angle by which the x-axis needs to be rotated around the Y-axis so as to be in the horizontal plane;

calculating a rotation angle based on both the x-axis tilt angle and the y-axis tilt angle, wherein the rotation angle is an angle by which the y-axis needs to be rotated around the X-axis so as to be in the horizontal plane to cause the y-axis to rotate following rotation of the x-axis; and calculating an azimuth of the body based on the geomagnetic force along the x-axis and the rotation angle wherein the azimuth calculating step includes calculating an azimuth of the body based on the geomagnetic forces along both the y-axis and the z-axis and the rotation angle calculated, and the calculating the rotation angle step includes calculating the rotation angle based on a coordinate expression for rotations three times expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where $\alpha$ is a rotation angle around the X-axis, $\beta$ is an x-axis tilt angle as a rotation angle around the Y-axis, and $\theta$ is a rotation angle around the Z-axis as an azimuth of the body.

22. A computer program product that records a computer program for realizing on a computer a directional measuring method of measuring a direction of a body of the directional measuring device in a three-dimensional space including an X-axis indicating magnetic north on a horizontal plane, a Y-axis orthogonal to the X-axis on the horizontal plane, and a Z-axis orthogonal to the horizontal plane, assuming that the body points towards an x-axis, the computer program making the computer execute:

detecting a geomagnetic force along a first axis from among the x-axis, a y-axis that is orthogonal to the x-axis, and a z-axis that is orthogonal to both the x-axis and the y-axis;

detecting a geomagnetic force along a second axis other than the first axis from among the x-axis, the y-axis, and the z-axis;

receiving a total geomagnetic force at a present position of the body, wherein the total geomagnetic force is a vector addition of geomagnetic forces along the X-axis, the Y-axis, and the Z-axis;

calculating a geomagnetic force along an axis other than the first axis and the second axis, from among the x-axis, the y-axis, and the z-axis based on the total geomagnetic force and the geomagnetic forces along both the first axis and the second axis;

detecting an x-axis tilt angle that is an angle between the horizontal plane and the x-axis;

detecting a y-axis tilt angle that is an angle between the horizontal plane and the y-axis;

calculating a rotation angle based on both the x-axis tilt angle and the y-axis tilt angle, wherein the rotation angle is an angle by which the y-axis needs to be rotated around the X-axis so as to be in the horizontal plane when the x-axis is rotated by the x-axis tilt angle around the Y-axis so as to be in the horizontal plane to cause the y-axis to rotate following rotation of the x-axis axis; and calculating an azimuth of the body based on the geomagnetic forces along the y-axis and the z-axis and the rotation angle wherein the rotation angle calculating step includes calculating the rotation angle based on a coordinate expression for rotations three time expressed by an expression $$\begin{bmatrix} \cos\theta & \sin\theta & 0 \\ -\sin\theta & \cos\theta & 0 \\ 0 & 0 & 1 \end{bmatrix} \times \begin{bmatrix} \cos\beta & 0 & -\sin\beta \\ 0 & 1 & 0 \\ \sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix}$$

where $\alpha$ is a rotation angle around the X-axis, $\beta$ is an x-axis tilt angle as a rotation angle around the Y-axis, and $\theta$ is a rotation angle around the Z-axis as an azimuth of the body.

* * * * *